United States Patent
Kreuger

(12) 
(10) Patent No.: US 9,695,748 B2
(45) Date of Patent: Jul. 4, 2017

(54) ENERGY STORAGE AND RETRIEVAL SYSTEMS

(71) Applicant: Sten Kreuger, Chonburi (TH)

(72) Inventor: Sten Kreuger, Chonburi (TH)

( * ) Notice: Subject to any disclaimer, the term of this patent is extended or adjusted under 35 U.S.C. 154(b) by 0 days.

(21) Appl. No.: 15/094,785

(22) Filed: Apr. 8, 2016

(65) Prior Publication Data

US 2016/0298498 A1    Oct. 13, 2016

Related U.S. Application Data

(60) Provisional application No. 62/146,186, filed on Apr. 10, 2015.

(51) Int. Cl.

| | | |
|---|---|---|
| *F02C 1/10* | (2006.01) | |
| *F28D 20/00* | (2006.01) | |
| *F03G 6/06* | (2006.01) | |
| *F02C 1/05* | (2006.01) | |
| *F01K 5/00* | (2006.01) | |

(52) U.S. Cl.
CPC ............ *F02C 1/10* (2013.01); *F01K 5/00* (2013.01); *F02C 1/05* (2013.01); *F03G 6/06* (2013.01); *F28D 20/0034* (2013.01); *F05D 2260/42* (2013.01); *F28D 2020/0082* (2013.01)

(58) Field of Classification Search
CPC . F01K 23/12; F01K 3/02; F01K 23/06; F02C 1/10; F02C 1/05; F03G 6/06; F28D 20/02
USPC ............... 60/641.8, 655, 650, 682–684, 659
See application file for complete search history.

(56) References Cited

U.S. PATENT DOCUMENTS

| 657,124 A | 9/1900 | Libbey |
|---|---|---|
| 1,294,714 A | 2/1919 | Ruths |
| 4,873,828 A * | 10/1989 | Laing ............... F03D 9/001 114/256 |

(Continued)

FOREIGN PATENT DOCUMENTS

EP    2778406 A1    9/2014

OTHER PUBLICATIONS

"Solar Thermal Energy"; 19 pgs.; https://en.wikipedia.org.
"The Parabolic Trough Power Plants Andasol 1 to 3"; Solar Millennium AG; 26 pgs.; Erlangen, Germany.

*Primary Examiner* — Hoang Nguyen
(74) *Attorney, Agent, or Firm* — Andrew D. Fortney; Central California IP Group, P.C.

(57) ABSTRACT

Systems and methods for storing and retrieving thermo-mechanical energy are disclosed. The systems and methods include a thermodynamic cycle (e.g., a reversible transcritical, trilateral, Brayton or Rankine/vapor compression cycle) that includes a plurality of loops and works as a heat pump in charging mode and as a heat engine in discharging mode. Each loop in the thermodynamic cycle includes pressure increasing and decreasing devices, high and low pressure heat exchanging devices, and the same or different working fluid. The system further includes one or more heat storage chains with hot and cold storage reservoirs and a heat storage fluid. At least one of the high and low pressure heat exchanging devices is a gradient heat exchanging device that exchanges heat with the heat storage chain. Also, at least one other high or low pressure heat exchanging device exchanges heat with a separate heat storage device or a heat source or sink.

22 Claims, 17 Drawing Sheets

(56) References Cited

U.S. PATENT DOCUMENTS

| | | | |
|---|---|---|---|
| 7,845,172 B2* | 12/2010 | Goldman | F01K 13/00 |
| | | | 60/641.15 |
| 8,443,605 B2 | 5/2013 | Ruer | |
| 8,826,664 B2 | 9/2014 | Howes et al. | |
| 2010/0218500 A1 | 9/2010 | Ruer | |
| 2010/0251711 A1 | 10/2010 | Howes et al. | |
| 2012/0060501 A1* | 3/2012 | Hemrle | F02C 1/10 |
| | | | 60/645 |
| 2012/0216536 A1 | 8/2012 | Ma et al. | |
| 2013/0147197 A1* | 6/2013 | Goebel | F01K 3/12 |
| | | | 290/52 |
| 2014/0060051 A1* | 3/2014 | Ohler | F01K 3/12 |
| | | | 60/652 |
| 2015/0059342 A1 | 3/2015 | Kruger et al. | |

* cited by examiner

ENERGY STORAGE AND RETRIEVAL SYSTEMS

RELATED APPLICATION(S)

The present application claims priority to U.S. Provisional Pat. Appl. No. 62/146,186, filed Apr. 10, 2015, incorporated herein by reference in its entirety. The present application may also be related to U.S. patent application Ser. Nos. 14/512,168 and/or 14/658,617, respectively filed on Oct. 10, 2014 and Mar. 16, 2015, the relevant portions of which are incorporated herein by reference.

FIELD OF THE INVENTION

The present invention generally relates to the field of energy storage and retrieval. More specifically, embodiments of the present invention pertain to methods and systems that use thermal energy for storing and retrieving thermal and/or mechanical energy.

DISCUSSION OF THE BACKGROUND

Energy storage is important for sustainable energy supply from sources such as wind and the sun.

Energy stored as heat and retrieved as mechanical energy has been around ever since the liquid air car (U.S. Pat. No. 657,124 from 1899) and the Ruths' steam accumulator (U.S. Pat. No. 1,294,714 from 1919).

Saipem-Ruer (U.S. Pat. No. 8,443,605), Isentropic Ltd. (U.S. Pat. No. 8,826,664), and Siemens (US Patent Application Publication No. 2015/0059342) use a Brayton cycle with solid hot and cold storage media. The disadvantages of this approach include pressure losses when the working gas traverses through the heat storage and the expensive high pressure storage tanks. There are also difficulties with a uniform stable moving temperature gradient in the storage tanks.

Pumped heat storage liquid has an advantage with cheaper low pressure tanks for the high temperature storage liquid. The Andasol in Spain and Solana in Arizona use mirror-based solar energy collectors, salt heat storage and steam turbines. The efficiency of the Andasol steam cycle is 35%, and 76 kg of salt per stored electric kWh (13.5 Wh/kg).

ABB (EP Patent No. 2,778,406) concerns a reversible $CO_2$ Brayton cycle, working at or near ambient temperature, using pumped heat storage and high temperature pumped heat storage. The heat storage is common with a solar collector system.

Alliance (US Patent Application Publication No. 2012/0216536) concerns a carbon dioxide Brayton cycle for solar heat, which in one embodiment, is combined with a transcritical cycle.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to a thermo-mechanical pumped heat energy storage system and methods of using the same that uses the heat storage material more efficiently, over a wider temperature range, and with (more) efficient heat transfer processes and/or higher specific energy density than previous work. The systems and methods generally include a thermodynamic cycle (e.g., a reversible transcritical, trilateral, Brayton or Rankine/vapor compression cycle) that includes a plurality of loops and works as a heat pump in charging mode and as a heat engine in discharging mode. They can be used together with PV-cells, wind or other discontinuous energy sources, on an hourly, daily or seasonal basis. For example, the thermo-mechanical energy storage system may comprise a first apparatus comprising a plurality of loops, each loop comprising pressure increasing and decreasing devices, low pressure and high pressure heat exchanging devices, and a working fluid. In each of the loops, at least one of the low pressure and high pressure heat exchanging devices is a gradient heat exchanging device. The system also includes a first heat storage chain and a heat storage device or a heat source. The heat storage chain comprises cold and hot storage reservoirs, a gradient heat exchanging device and a heat storage liquid that is transferred between the cold and hot storage reservoirs. At least one of the low pressure and high pressure heat exchanging devices in at least one of the loops exchanges heat with the heat storage device or heat source. In some cases, the heat source is also a heat sink when the loops operate in the reverse direction.

In some embodiments, the working fluid in each loop is a common working fluid. Alternatively, a different working fluid may be in one or more of the loops. Similarly, each of the pressure increasing and decreasing devices in each of the loops may be a shared device or a different device.

In various embodiments, a first loop works as a heat engine, and a second loop works as a heat engine. In additional or further embodiments, the apparatus is reversible and works as a heat engine in a discharging mode and as a heat pump in a charging mode. Additionally or alternatively, the first and second loops are reversible, and the second loop works as a heat engine when the first loop works as a heat engine and as a heat pump when the first loop works as a heat pump.

In various other embodiments, a gradient heat exchanging device in each of the loops exchanges heat with the heat storage fluid, and in other or further cases, the gradient heat exchanging device of at least one loop exchanges heat with the gradient heat exchanging device of another loop. In some examples of the present thermo-mechanical energy storage system, at least one of the loops comprises a transcritical cycle, and the transcritical cycle includes an isothermal process that rejects heat to and/or absorbs heat from the heat storage device or the heat source/heat sink. Alternatively, one of the loops comprises a trilateral cycle, and the trilateral cycle includes an isothermal process that rejects heat to and/or absorbs heat from the heat storage device or the heat source/heat sink.

In some implementations, at least one of the loops is a Brayton cycle, and/or the heat storage device or heat source is a second heat storage fluid. Alternatively, the heat storage device or heat source is a solid material. In additional or alternative implementations, one of the loops is a transcritical cycle that may include an isothermal process that rejects heat to and/or absorbs heat from an ambient environment. In some examples of this thermo-mechanical energy storage system, the low pressure heat exchanging device in the transcritical cycle may include a quasi-isothermal heat transfer process.

In some embodiments of the thermo-mechanical energy storage system, the first heat storage liquid may comprise glycerin, and the first working fluid may comprise propane. In some embodiments of the thermo-mechanical energy storage system, the transcritical cycle may exchange heat with the heat storage device or heat source/heat sink isothermally.

In the discharging mode of the thermo-mechanical energy storage system, the heat sink may be air inside a house or other building in a cold climate or outside air in a warm climate, and in the charging mode, the heat source may be the air in the house or the building in the warm climate, or the outside air in the cold climate. Alternatively or additionally, the heat storage liquid may be heated by the sun, fuel, biofuel, or an electric current in the charging mode.

In a multi-cycle system where different materials or liquids are used in different cycles, and heat is transferred between the different materials or liquids, a problem may occur due to the different heat capacities of different materials within a given temperature range. Energy losses during heat exchanges between different materials with different heat capacities are known as "second law" losses. The highest efficiencies in a heat exchange system occur when the heat rejection process and the heat absorption process in the heat exchange are closely matched in heat capacity and temperature. In the present invention, heat capacities and temperatures of different materials in a heat exchange can be matched using compensating cycles. A compensating cycle is a way to compensate for different heat capacities of two liquids within a given temperature range over which the liquids exchange heat. In turn, this reduces the second law losses in the heat exchange.

If the heat capacities of different materials in a heat exchange are different, the temperature differences of the different materials increase along the heat transfer lines or conduits. An ideal heat exchanger has the smallest possible temperature difference between the different materials. An ideal heat exchange process may be characterized by lines that are as close to parallel as possible in the T/S graph.

Thus, in various embodiments of the thermo-mechanical energy storage system, the apparatus further comprises a compensating cycle that, in charging and/or discharging mode, transfers the heat in a first temperature region to another fluid (e.g., in the first apparatus or within the first apparatus) but not in a second temperature region (or in a second temperature range, but not in the first temperature range). The compensating cycle effectively moves heat energy (and/or heat exchanges) from one temperature range to another temperature range in order to match the different heat capacities of two or more fluids for more optimal heat transfer. The compensating cycle supports other cycles or heat transfer processes in the system. The working fluid is compressed or expanded in the compensating cycle to move the temperature range.

In further alternatives involving the compensating cycle, heat is rejected within the first temperature range from the storage material or working fluid having the higher heat transfer capacity in the first temperature range to a receiving material or working fluid, which is expanded or compressed in order to exchange heat with the same or different storage material or working fluid in a second temperature range where the receiving material or working fluid has a higher heat transfer capacity. For example, where heat is to be rejected within a given temperature range from one material with first heat capacity characteristics and absorbed by a different material with second, different heat capacity characteristics, some of the rejected heat (e.g., corresponding to the difference in heat capacities) is absorbed by the compensating cycle from the one material rejecting heat within a first temperature range in which the heat capacity of the one material is higher than the heat capacity of the other, heat-absorbing material, and rejected by the compensating cycle to the other, heat-absorbing material within a second temperature range in which the heat capacity of the other, heat-absorbing material is higher than the heat capacity of the one (heat-rejecting) material.

In various embodiments, the first working fluid comprises air, a noble gas, or an inert gas. Alternatively or additionally, the first working fluid and the second working fluid each comprise a condensable gas. The condensable gas may comprise air, a noble gas, an inert gas, water, sulfur, aniline, carbon dioxide, ammonia, a liquid metal, a liquid salt, an organic fluid or a combination of fluids. In one example, wherein the combination of fluids is a zeotropic mixture of fluids. Furthermore, the first heat storage liquid may comprise glycerin, a liquid glycol, sulfur, aniline, a liquid metal, a liquid mixture of salts, or a mixture of metals, in which case the condensable gas may comprise a mixture of metals (e.g., a mixture of alkali metals, such as potassium [in an amount, for example, of 72-78% by weight] and sodium [in an amount, for example, of 22-28% by weight]). Alternatively, the first and/or second heat storage fluid may comprise a suspension of solid particles.

When the heat source or heat sink comprises water, the water may be in a pond, a lake, an ocean or other natural body of water, a cooling tower, a district heating network, a cooling or air conditioning system, or a radiator or other man-made reservoir of water. In embodiments employing a second heat storage fluid, the second heat storage fluid may comprise water, liquid air, or a low temperature liquid (e.g., liquid propane, liquid air, or ethanol). When the second heat storage fluid comprises water, the water may comprise an ice slurry or a salt brine (e.g., a $CaCl_2$ brine). In one example, the first heat storage liquid comprises lithium, and the second heat storage liquid comprises propane.

Another aspect of the invention relates to a method of storing and/or retrieving energy, comprising producing mechanical energy in a first heat engine from a difference of heat absorbed from a first heat storage liquid and heat rejected to a first material, and supplying heat to the first heat storage liquid from a heat supply device. In one example, the heat supply device comprises an electrical heater. Alternatively, the method may comprise exchanging heat between a first working fluid in at least one first loop and a first heat storage liquid, and exchanging heat between said first working fluid and a low temperature material, wherein the first loop(s) comprise at least first and second pressure changing devices, at least a first heat exchanging device in a high pressure process, and a second heat exchanging device in a low pressure process.

In one embodiment, the heat supply device is a first heat pump, and the method further comprises absorbing heat in the first heat pump from the first material (or low temperature material), and rejecting heat (e.g., from the first heat pump or first loop) to the first heat storage liquid. The first heat pump may be reversible, in which case it may also work as the first heat engine in the present method. In an additional or alternative embodiment, the method further comprises driving heat rejection to the first heat storage liquid by mechanical energy supplied to a system comprising the first heat pump (or the first loop). In further embodiments, the first material may be a second heat storage liquid (e.g., a low temperature material such as ambient temperature water), a solid heat storage material, or ambient temperature air.

In some embodiments, the heat engine or first loop may be a transcritical heat engine, the first material may be a working fluid in the transcritical heat engine, the working fluid may reject heat to a second material, and the second material may exchange heat when the transcritical heat engine is operating. Furthermore, a system implementing the present method may further comprise a transcritical heat pump that includes the first material as a working fluid. The transcritical heat pump may absorb heat from a second material, and the second material may exchange heat when the first heat pump (which may be the transcritical heat pump) is operating.

In various embodiments, the second material comprises a second heat storage liquid (e.g., water), a solid heat storage material, or ambient temperature air or water. In some embodiments, in the discharging mode, the low temperature material is air inside a house or other building in a cold climate or outside air in a warm climate, and in the charging mode, the low temperature material is the air in the house or the building in the warm climate, or the outside air in the cold climate. Alternatively or additionally, the first storage liquid may be heated by the sun, fuel, biofuel, or an electric current in the charging mode.

In some embodiments of the method, the first heat engine is a Brayton heat engine, and the first heat pump may be a Brayton heat pump. Alternatively, the first heat engine is a transcritical heat engine, and the first heat pump may be a transcritical heat pump. In some cases, the first heat engine is reversible. In such cases, the first heat engine works in a discharging mode, and the first heat pump works in a charging mode. In some examples, the first heat engine has multiple loops with at least one common process (e.g., a temperature and/or pressure change).

One important concept in the present invention is to store mechanical energy as heat as efficiently as possible in a storage liquid. The mechanical energy stored as heat in the storage liquid may be measured in kWh/kg. The efficient storage of mechanical energy as heat is done by spreading or extending the heat or the heat exchange(s) over a relatively large temperature range (e.g., a maximum possible temperature range, in view of limitations on the working fluid[s], storage media, materials and configuration[s] of the apparatus[es], and other practical considerations).

One embodiment of the present invention that uses lithium as high temperature storage liquid has an energy storage density of 2.31 kg/kWh. By comparison, a lithium-ion battery has an energy storage density of 10 kg/kWh, and a lead battery has an energy storage density of 26 kg/kWh. An advantage of the present invention in vehicle applications is that the device can be charged quickly (a time period on the order of hours currently is necessary for lithium-ion battery charging), and with no apparent limitations on the number of charging cycles.

One embodiment of the present invention can extend the under-water speed and range of a non-nuclear submarine (e.g., a Japanese type 212 or Soryu-class submarine) to 20 knots full power, as compared to 4 knots using Stirling engines.

In one embodiment of the present invention using a PV-cell application, the hot storage medium or reservoir comprises a tank with an oxide-based composite salt (e.g., HALOGLASS RX, available from Halotechnics, Emeryville, Calif.), which can store heat at temperatures of, e.g., 1200° C. The present system can operate with an energy storage density of only 2 kg salt/kWh of mechanical energy, as compared to 74 kg/kWh for the high temperature salt storage system at Andasol in Spain.

One of the main features of the present invention is the ability to minimize second law losses. Second law losses are generated when the ratio of the heat transfer capacity of the working fluid in the loop and the heat transfer capacity of the storage fluid or medium varies along the heat exchange temperature range. The heat transfer capacity (kW/K) of the fluid is the flow of the fluid (in kg/s) multiplied by the specific heat capacity of the fluid (in kJ/kg K). ABB has compensated for second law losses using multiple tanks for the heat storage liquid. The present invention effectively divides the cycle into multiple loops and/or selective pairing of hot and cold storage liquids. As an example, in a typical or useful temperature range, the heat capacity of modified terphenyl-based liquids (e.g., THERMINOL heat transfer fluids, available from Eastman Chemical Company, Kingsport, Tenn.) increases with temperature (e.g., it is 1.5 J/g K at 10° C., and 3 J/g K at 400° C.). In the typical or useful temperature range, the heat capacity of propane and $CO_2$ does the opposite and decreases with an increase in the temperature.

Another feature of the present invention is the ability to use a very wide temperature range for the storage fluid(s). This effectively increases the storage capacity (kWh/kg). When electricity is cheap, direct electric heating of the high temperature heat storage fluid may be advantageous (see, e.g., FIG. 13). Also, adding a pressurized inert gas in one or more storage tanks facilitates the transfer of the heat storage liquid between the tanks.

DETAILED DESCRIPTION

Figure 1:
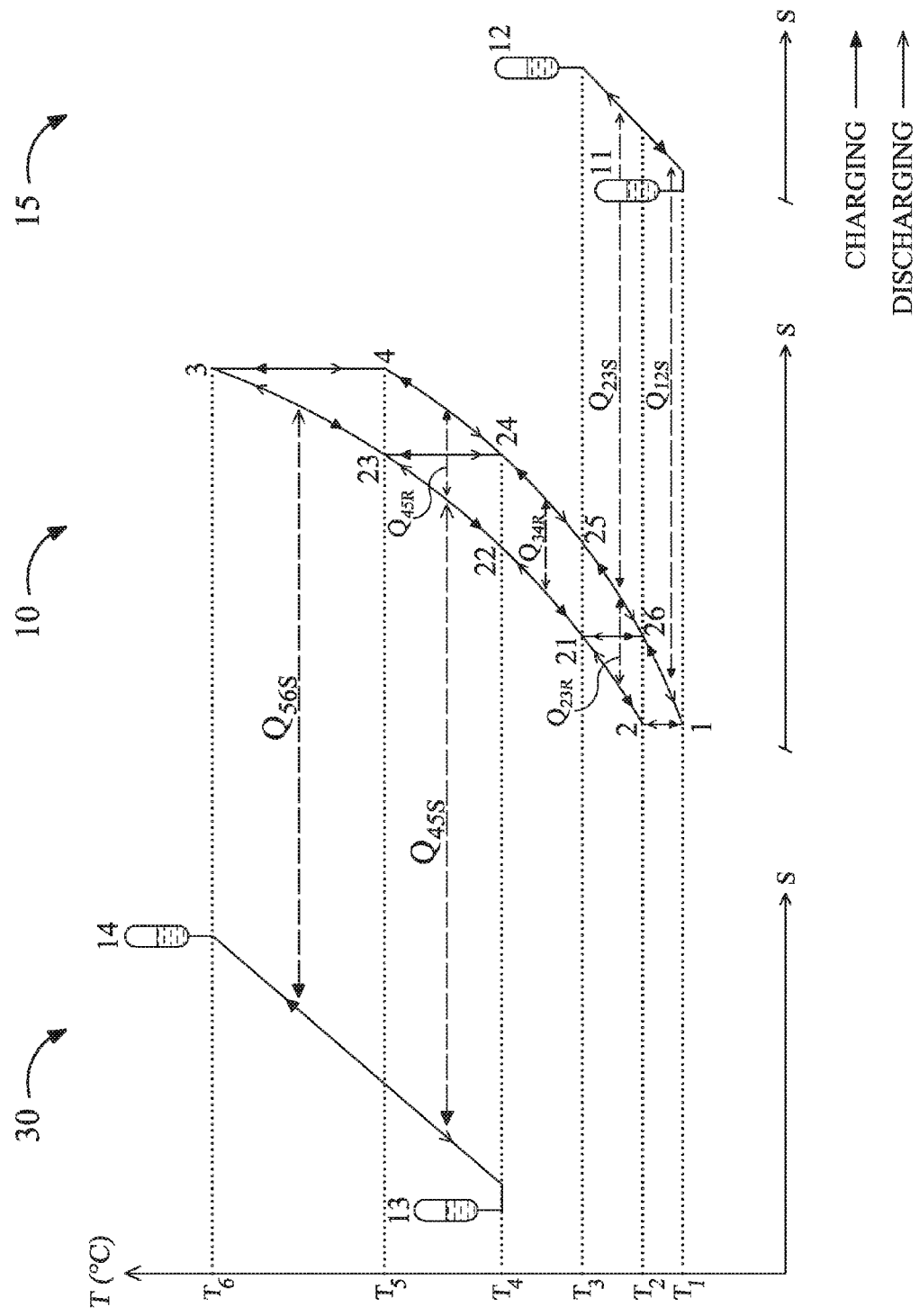
FIG. 1 shows a temperature-entropy (TS) diagram of a Brayton cycle with 2 loops and a very large temperature range.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and materials have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

For the sake of convenience and simplicity, the terms "loop," "cycle" and "thermodynamic cycle" are generally used interchangeably herein, but are generally given their art-recognized meanings. Also, for convenience and simplicity, the terms "connected to," "coupled with," "coupled to," and "in communication with" may be used interchangeably, as may the terms "tank" and "vessel," and use of one of the terms in one of these groups will generally include the others unless the context of use clearly indicates otherwise, but these terms are also generally given their art-recognized meanings. For convenience, a flow from a first identified point to a second identified point in a thermodynamic cycle may be represented by a designation "X-Y," where X is the first identified point in the cycle and Y is the second identified point in the cycle. Also, a "solid" material refers to a material or substance that is in the solid phase at temperature intervals of the heat exchanges in which it participates.

The invention, in its various aspects, will be explained in greater detail below with regard to exemplary embodiments.

An Exemplary Thermomechanical Energy Storage and Retrieval Cycle

FIG. 1 shows a temperature-entropy (TS) diagram of a Brayton cycle with 2 loops and a large temperature range. The Brayton cycle in the TS diagram in FIG. 1 is reversible. The cycle can be considered as a big loop (e.g., 1-2-21-22-23-3-4-24-25-26-1) and a small loop (e.g., 26-21-22-23-24-25-26) combined. The cycle is used to store and retrieve thermal energy from a low-temperature heat storage subsystem 15 and a high-temperature heat storage subsystem 30. The low-temperature heat storage subsystem 15 includes first and second tanks 11 and 12 and a low-temperature storage fluid that is transferred between the tanks 11 and 12 during energy storage and retrieval processes. The high-temperature heat storage subsystem 30 includes third and fourth tanks 13 and 14 and a high-temperature heat storage fluid that is transferred between the tanks 13 and 14 during energy storage and retrieval processes.

In discharging (energy retrieval) mode, the heat $Q_{45S}$ from the heat storage fluid in the temperature range $T_4$-$T_5$ is transferred to the high pressure working fluid in the Brayton cycle at 22-23, and the heat $Q_{56S}$ from the heat storage fluid in the temperature range $T_5$-$T_6$ is transferred to the high pressure working fluid in the Brayton cycle at 23-3. Adiabatic expansion processes occur in the big loop at 3-4 and in the small loop at 23-24. Adiabatic compression processes occur in the big loop at 1-2 and in the small loop at 26-21. Heat transfer (e.g., intraloop and/or inter-loop heat transfer) for both loops occurs between 21-22 and 24-25. Heat transfer for the big loop (i.e., intraloop heat transfer) occurs between 2-21-22-23 and 4-24-25-26.

In the big loop, heat transfer is from the hot storage liquid in the temperature range $T_5$-$T_6$ to the working fluid at 23-3, and from the working fluid at 26-1 to the cold storage liquid in the temperature range $T_1$-$T_2$. In both the small loop and the big loop, heat transfer is from the hot storage liquid in the temperature range $T_4$-$T_5$ to the working fluid at 22-23, and from the working fluid at 25-26 to the cold storage liquid in the temperature range $T_2$-$T_3$.

The charging (energy storage) mode is substantially the reverse process(es) of the discharging mode, as will be explained in more detail with regard to FIG. 2.

An Exemplary Layout

Figure 2:
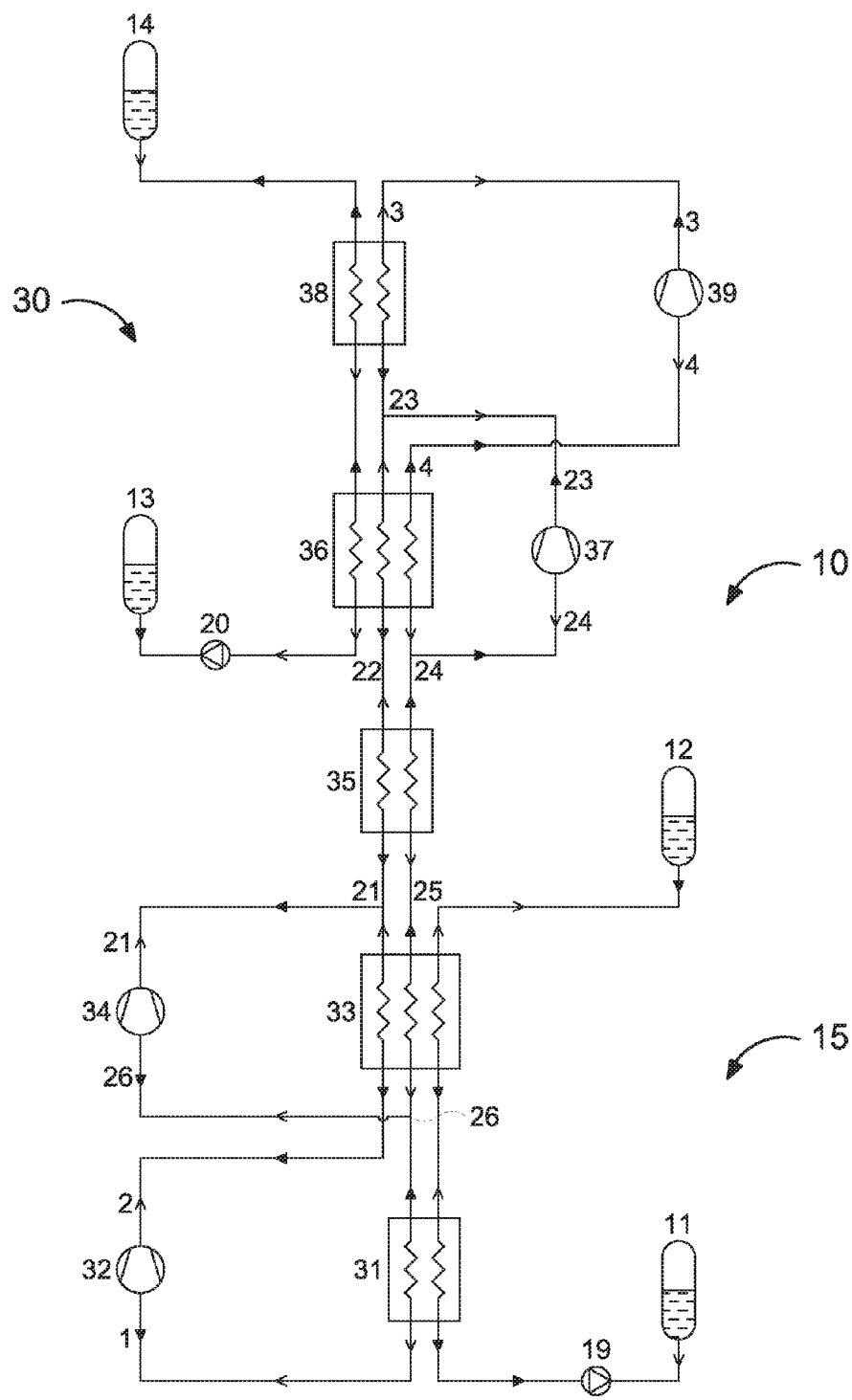
FIG. 2 shows an outline of an apparatus implementing the cycles and heat storage subsystems of FIG. 1.

FIG. 2 is an outline of an apparatus implementing the cycles and heat storage subsystems of FIG. 1.

In discharging mode, the device 10 in FIG. 2 is a Brayton heat engine, which retrieves energy using the low temperature energy storage subsystem 15 and the high-temperature energy storage subsystem 30. Recuperators 33, 36 have dual functions as intraloop and/or inter-loop working fluid heat exchangers and as storage liquid-working fluid heat exchangers.

Starting at 1 in the big loop, in the discharging mode, the compressor 32 compresses the working fluid (gas) from 1 to 2. The recuperators 33, 35, and 36 heat the high pressure gas at 2-21-22-23. The heat exchanger 38 cools the hot storage liquid from $T_6$ to $T_5$, thereby further heating the working gas in the big loop from 23 to 3. The expander 39 expands the gas from 3 to 4, resulting in recovery or retrieval of mechanical energy. The recuperators 36, 35, and 33 cool the low pressure gas at 4-24-25-26. The heat exchanger 31 heats the cold storage liquid from $T_1$ to $T_2$, thereby cooling the working gas from 26 to 1.

Starting at 26 in the small loop, in the discharging mode, the compressor 34 compresses the gas from 26 to 21. The recuperator 35 heats the high pressure gas from 21 to 22. The heat exchanger 36 cools the hot storage liquid from $T_5$ to $T_4$, thereby heating the working fluid (gas) in the small loop from 22 to 23. Expander 37 expands the working gas from 23 to 24, resulting in recovery or retrieval of mechanical energy. The recuperator 35 cools the low pressure working gas from 24 to 25. The heat exchanger 33 heats the cold storage liquid from $T_2$ to $T_3$, thereby further cooling the working gas from 25 to 26.

In charging (energy storage) mode, the device 10 in FIG. 2 is a Brayton heat pump. Device 10 includes expanders 32 and 34 and compressors 37 and 39 in the charging mode. The heat exchanger 31 heats the working gas from 1 to 26 (e.g., from temperature $T_1$ to temperature $T_2$; see FIG. 1), thereby cooling the cold storage liquid. The recuperators 33, 35, and 36 heat the low pressure gas at 26-25-24-4. The heat exchanger 38 heats the hot storage liquid from $T_5$ to $T_6$, thereby cooling the working gas in the big loop from 3 to 23. The recuperators 33, 35, and 36 further cool the high pressure gas at 23-22-21-2, transferring some heat to the energy storage subsystem 30 in recuperator 36 and some heat to the low-pressure side of the cycle 10 (e.g., intraloop and/or inter-loop) in recuperators 33 and 35. When the device 10 functions as a Brayton heat pump, pumps 19 and 20 in the energy storage subsystems 15 and 30, respectively, pump in an opposite direction to the directions of the pumps 19 and 20 when the device 10 functions as a Brayton heat engine.

A Second Exemplary Thermomechanical Energy Storage and Retrieval Cycle

Figure 3:
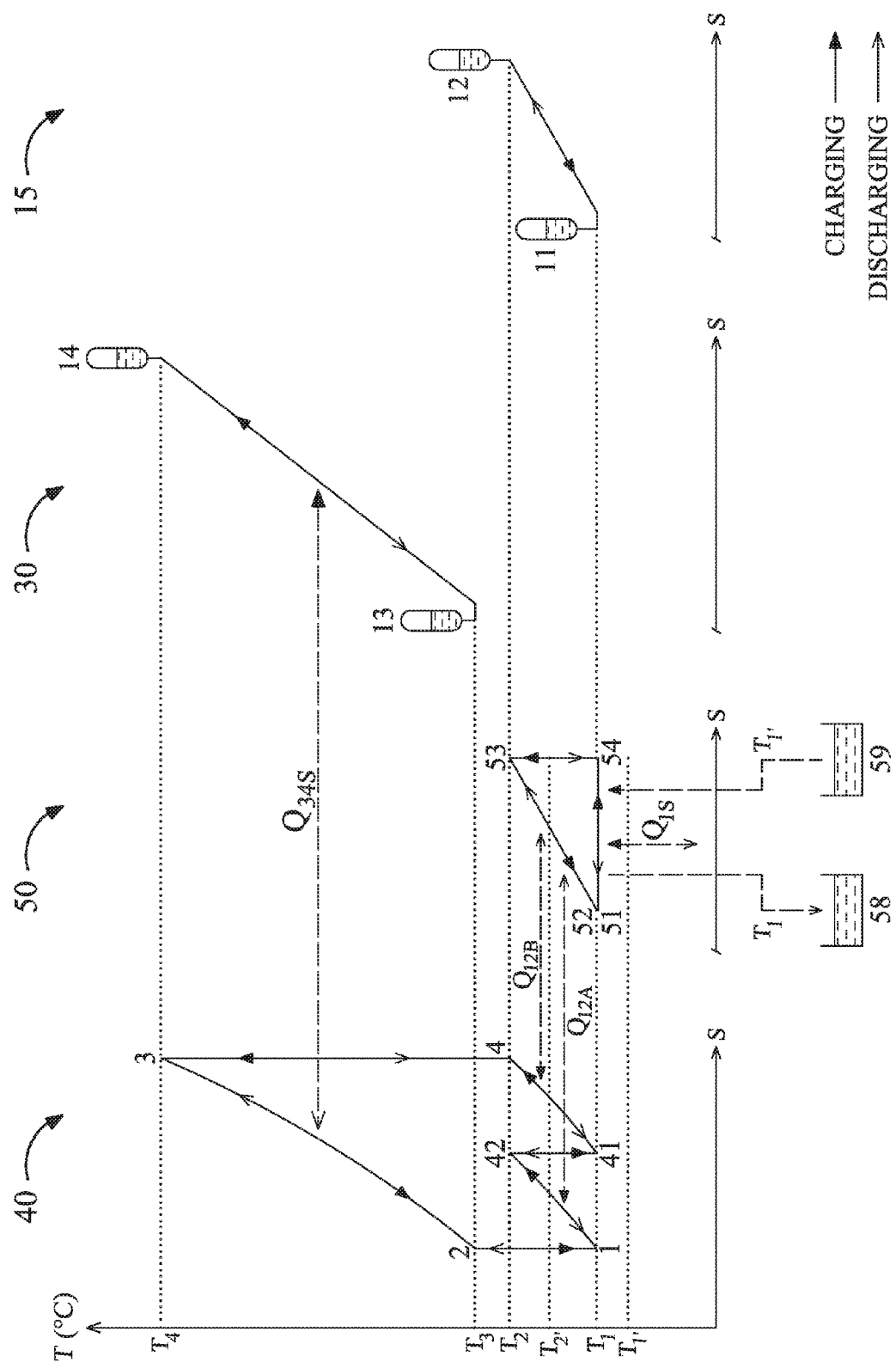
FIG. 3 shows a TS diagram of combined Brayton and trilateral cycles with (1) a single-step hot heat exchanger and (2) two cold heat exchangers in two steps that operate in the same temperature range. This is useful when the hot liquid has a large temperature span and the cold fluid has a small liquid temperature span and/or high specific heat capacity (e.g., water, $NH_3$). In the depicted example, the cold fluid is the working fluid in the trilateral cycle, with isothermal rejection to an ambient environment.

FIG. 3 shows a TS diagram for a combined Brayton cycle 40 and trilateral cycle 50. In this embodiment, the trilateral cycle 50 converts gradient heat in (e.g., 52-53) or out (e.g., 53-52) to isothermal heat out (e.g., 54-51) or in (e.g., 51-54), respectively.

As mentioned above, energy losses during heat exchanges between different materials with different heat capacities are known as "second law" losses. One way to compensate for different heat capacities of two liquids within a given temperature range over which the liquids exchange heat is to use a compensating cycle. Another way to compensate for the differences in heat capacity is to split the material or liquid with the higher capacity into two streams (e.g., the flows between 52 and 53 in FIG. 4), where the material or liquid with the lower (or higher) capacity rejects thermal energy to the other material or liquid (or to part of the other material or liquid), is heated (e.g., by compression using a compressor) and then rejects thermal energy again to the other material or liquid. This multiple heat exchange process may be performed in a temperature range in which the best possible match in temperatures (e.g., the smallest possible temperature difference between the different materials or liquids) along the heat transfer line(s) occurs.

In discharging mode, in the Brayton cycle 40, 1-2 and 41-42 are adiabatic compression processes. 3-4 is an adiabatic expansion process. The heat $Q_{34S}$ from the heat storage fluid in the high-temperature energy storage subsystem 30 is transferred at 14-13 to the high pressure working fluid at 2-3. 4-41 and 42-1 are heat rejection processes to the high pressure working fluid in the trilateral cycle 50 at 52-53. The trilateral cycle 50 converts the low pressure gradient heat exchange(s) in the Brayton cycle 40 to an isothermal heat exchange in the trilateral cycle 50.

In the trilateral cycle 50, 51-52 is a pressure increasing process (e.g., a pumping process). 52-53 is the heat absorption process from the working fluid at 4-41 and 42-1 in the Brayton cycle 40. 53-54 is an adiabatic expansion process. 54-51 is a heat transfer from the low pressure working fluid in the trilateral cycle in an isothermal process to the cold storage liquid 58 at $T_1$.

In charging mode, in the Brayton cycle 40, 1-42 and 41-4 are heat absorption processes (e.g., that absorb heat $Q_{12A}$ and $Q_{12B}$ from the heat rejection process 53-52 in the trilateral cycle 50), and 3-2 is a heat rejection process to the heat storage liquid 30. 2-1 and 42-41 are adiabatic expansion processes, and 4-3 is an adiabatic compression process.

In the trilateral cycle 50, 51-54 is an isothermal heat absorption process from the cold storage liquid (e.g., body or reservoir of water 59), where the working fluid changes from liquid to gas at $T_1$. 53-52 is a heat rejection process to the heat absorption processes 1-42 and 41-4 as mentioned above. 54-53 is an adiabatic compression process, and 52-51 is an adiabatic expansion process.

Bodies or reservoirs of water 58 and 59 may be the same or different bodies or reservoirs of water, or different locations in the same body or reservoir of water. The cold storage liquid or subsystem 15 is an alternative to the trilateral cycle 50.

Further Exemplary Layouts

Figure 4:
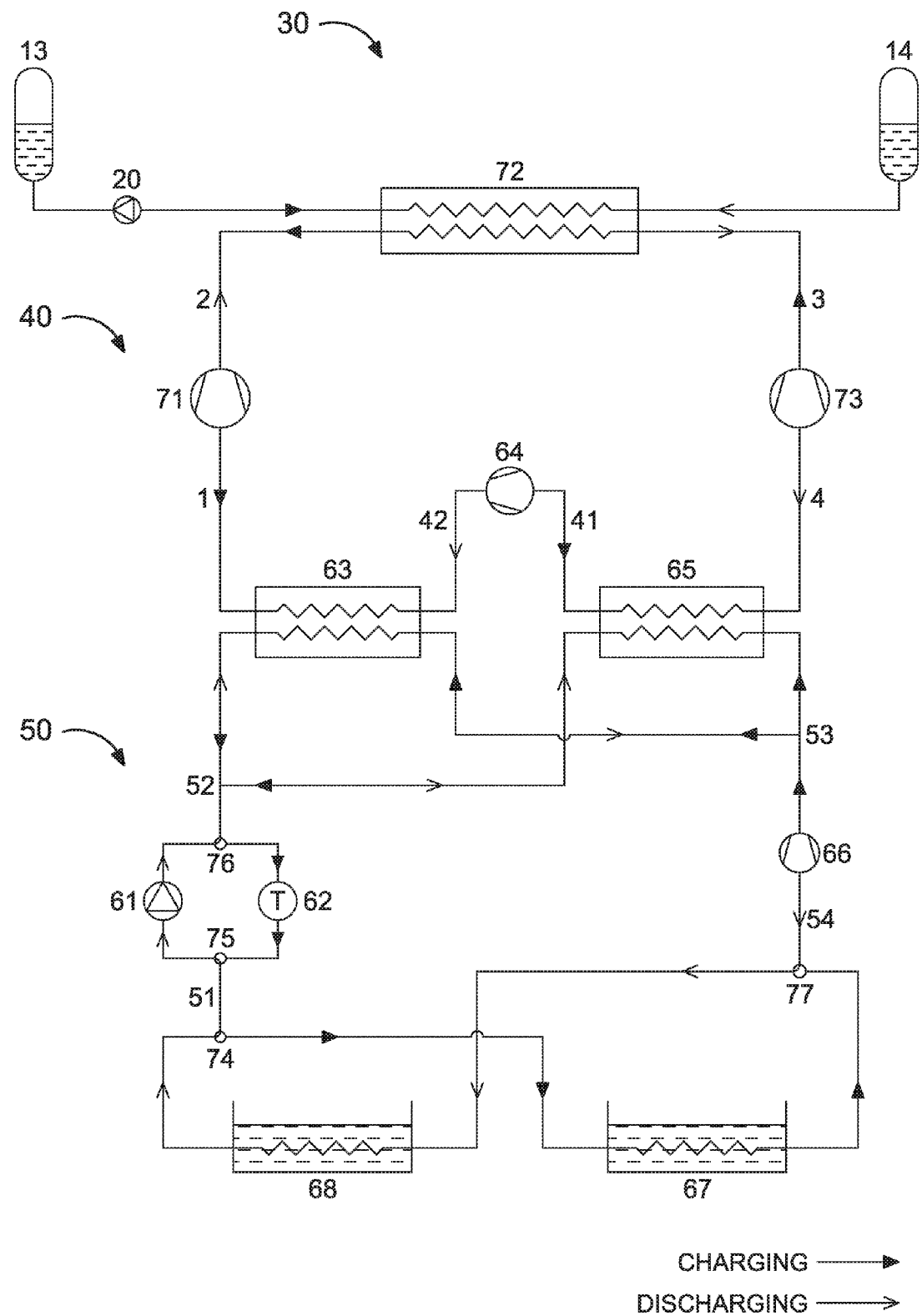
FIG. 4 is an outline of an apparatus implementing the combined Brayton and trilateral cycles and the heat storage subsystem depicted in FIG. 3.

FIG. 4 is a layout depicting an apparatus implementing the cycles 40, 50 and heat storage subsystem 30 of FIG. 3.

In discharging mode, in the Brayton cycle 40, compressor 71 compresses the gas from 1 to 2. The heat exchanger 72 cools the hot storage liquid in heat storage subsystem 30 from $T_4$ to $T_3$, thereby heating the working gas in the Brayton cycle 40 from 2 to 3. The expander 73 expands the gas from 3 to 4, which results in recovery or retrieval of mechanical energy. The heat exchangers 65 and 63 cool the low pressure gas in the Brayton cycle 40 at 4-41 and 42-1, respectively. The compressor 64 compresses the gas from 41-42, between the heat exchangers 65 and 63.

In the trilateral cycle 50, in discharging mode, the pump 61 pumps the working fluid from 51-52. At 52-53, the working fluid in the trilateral cycle 50 exchanges heat with the working fluid in the Brayton cycle 40 in both heat exchangers 65 and 63 (e.g., in parallel paths). The expander 66 expands the working fluid from 53-54, thereby recovering or retrieving additional mechanical energy. 54-51 is an isothermal heat rejection process at $T_1$ from the working fluid to the cold storage liquid 58 (e.g., a body or reservoir of water) in the heat exchanger 68.

In charging mode, 64 and 71 are expanders, 66 and 73 are compressors, and 62 is a turbine or JT expander. Valves (e.g., a pair of 3-way valves) 75 and 76 between 51 and 52 select between the pump 61 and the turbine or JT expander 62, depending on whether the trilateral cycle 50 is in discharging or charging mode, respectively. 51-54 is an isothermal heat absorption process at $T_1$, from the cold storage liquid 59 (e.g., a body or reservoir of water) to the working fluid in the heat exchanger 67. Bodies or reservoirs of water in the heat exchangers 67 and 68 may be different bodies or reservoirs of water, or different locations in the same body or reservoir of water. Valves (e.g., a pair of 3-way valves) 77 and 74 also select between the heat exchangers 67 and 68, depending on whether the trilateral cycle 50 is in charging or discharging mode. In charging mode, pump 20 works in an opposite direction to the direction of the pump 20 in the discharging mode.

Figure 5:
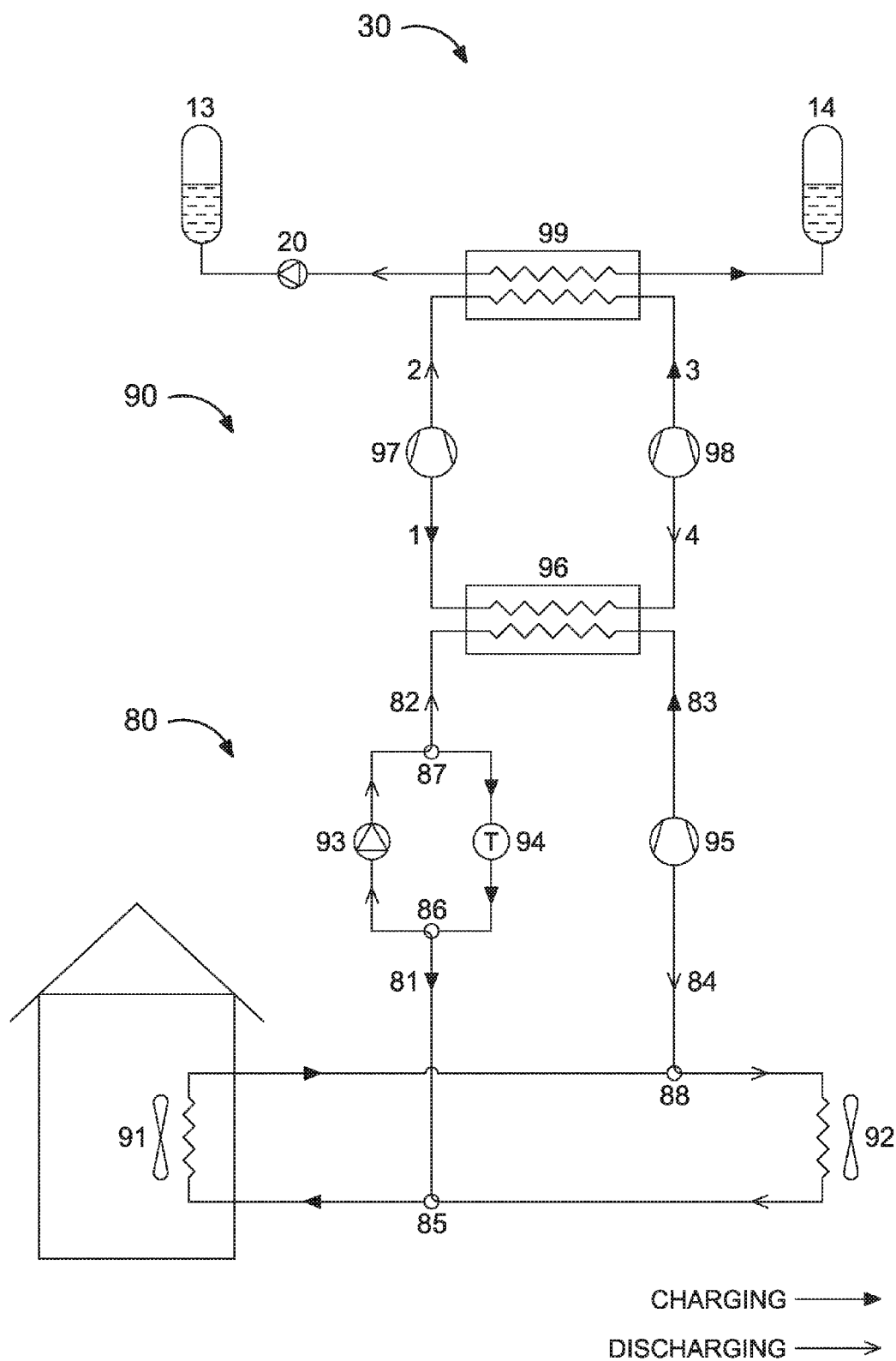
FIG. 5 is an outline of combined Brayton and trilateral cycles absorbing heat from an indoor environment (e.g., a house or other building) in charging mode and rejecting the heat to an outside environment in discharging mode.

FIG. 5 shows an alternative thermomechanical energy storage and retrieval system including a Brayton cycle 90, a trilateral cycle 80, and the heat storage subsystem 30. In discharging mode, the loop 1-2-3-4-1 is a Brayton heat engine. Compressor 97 compresses the gas from 1 to 2. The heat exchanger 99 cools the hot storage liquid (e.g., as it is transferred from high-temperature storage tank 14 to low-temperature storage tank 13) while heating the working gas in the Brayton cycle from 2 to 3. The expander 98 expands the working fluid in the Brayton cycle from 3 to 4, resulting in recovery or retrieval of mechanical energy. The heat exchanger 96 cools the low pressure gas in the Brayton cycle from 4 to 1.

In discharging mode, the loop 81-82-83-84-81 is a trilateral heat engine 80. The pump 93 pumps the working fluid from 81-82. The expander 95 expands the working fluid from 83-84, thereby recovering or retrieving additional mechanical energy. In the condenser 92, 84-81 is an isothermal heat rejection process from working fluid to the ambient environment (e.g., air in an external or outdoor environment).

In charging mode, the loops and processes generally work in reverse. For example, 97 is an expander, 95 and 98 are compressors, and 94 is a turbine or JT expander. Valves (e.g., a pair of 3-way valves) 86 and 87 between 81 and 82 select between the pump 93 and the turbine or JT expander 94, depending on whether the trilateral cycle 80 is in discharging or charging mode, respectively. The process 81-84 in the evaporator 91 is an isothermal heat absorption process from indoor air (e.g., is a house, office or apartment building, factory, warehouse or storage facility, etc.) to the working fluid in the trilateral cycle 80. Valves (e.g., a pair of 3-way valves) 88 and 85 between 84 and 81 also select between the condenser 92 and the evaporator 91, depending on whether the trilateral cycle 80 is in discharging or charging mode. In the charging mode, pump 20 in the heat storage subsystem 30 works in an opposite direction to the direction of the pump 20 in the discharging mode.

Figure 6:
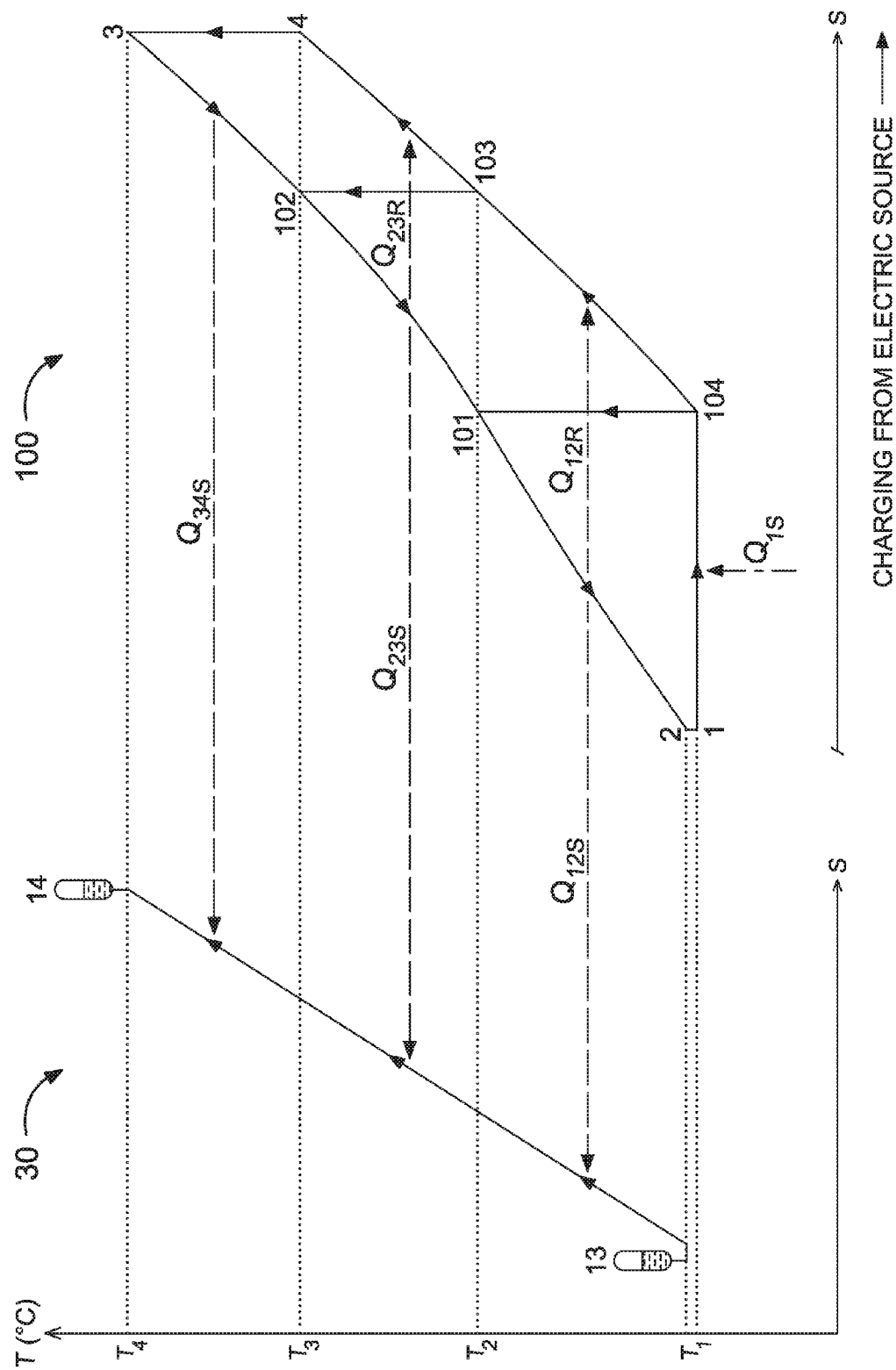
FIG. 6 is a TS diagram of a transcritical cycle with 3 loops in charging mode and a heat storage subsystem.
Figure 8:
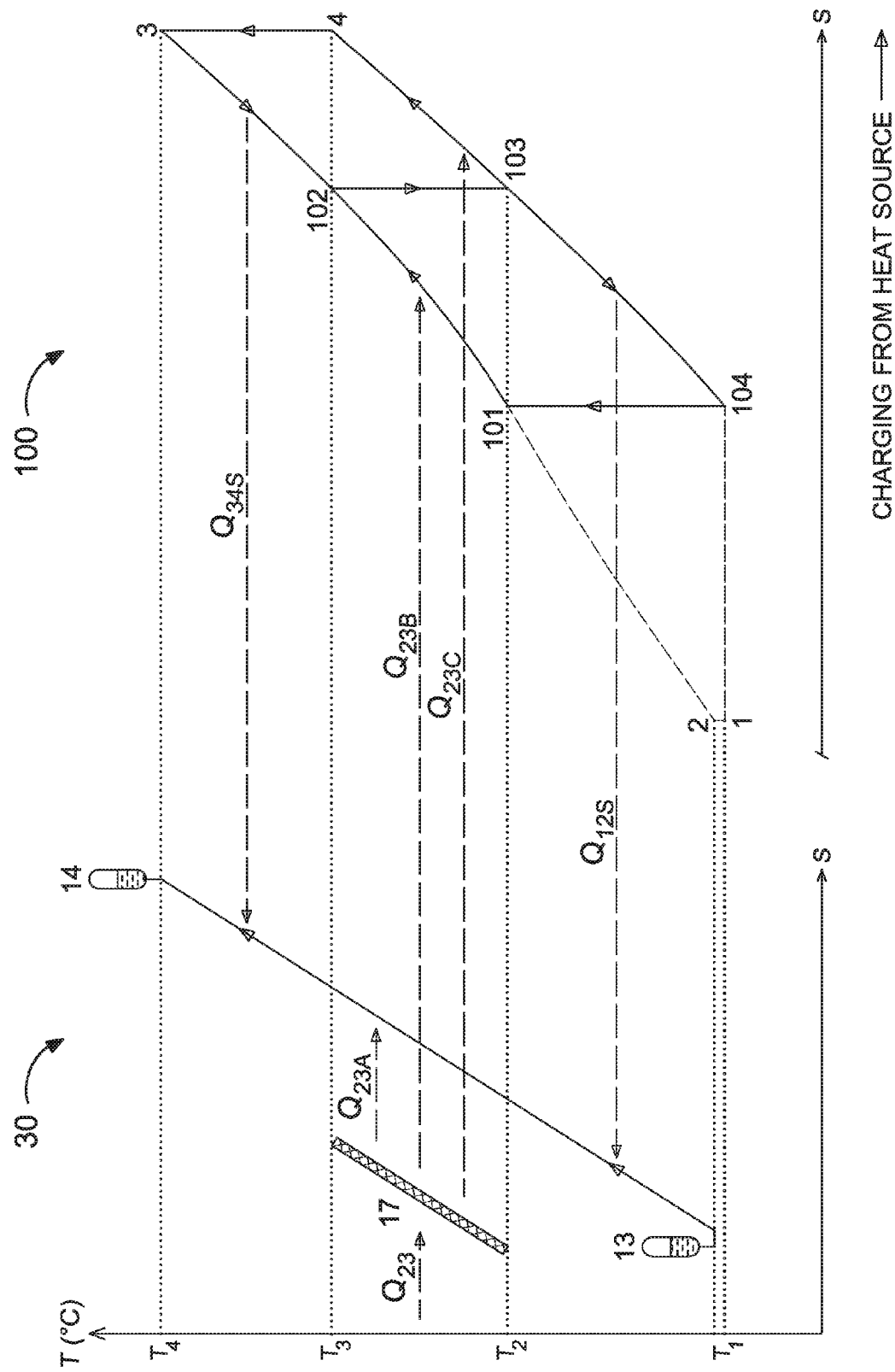
FIG. 8 is a TS diagram of a transcritical cycle similar to that of FIG. 6 in charging mode, with 2 of the 3 loops and a solar energy heat source.
Figure 10:
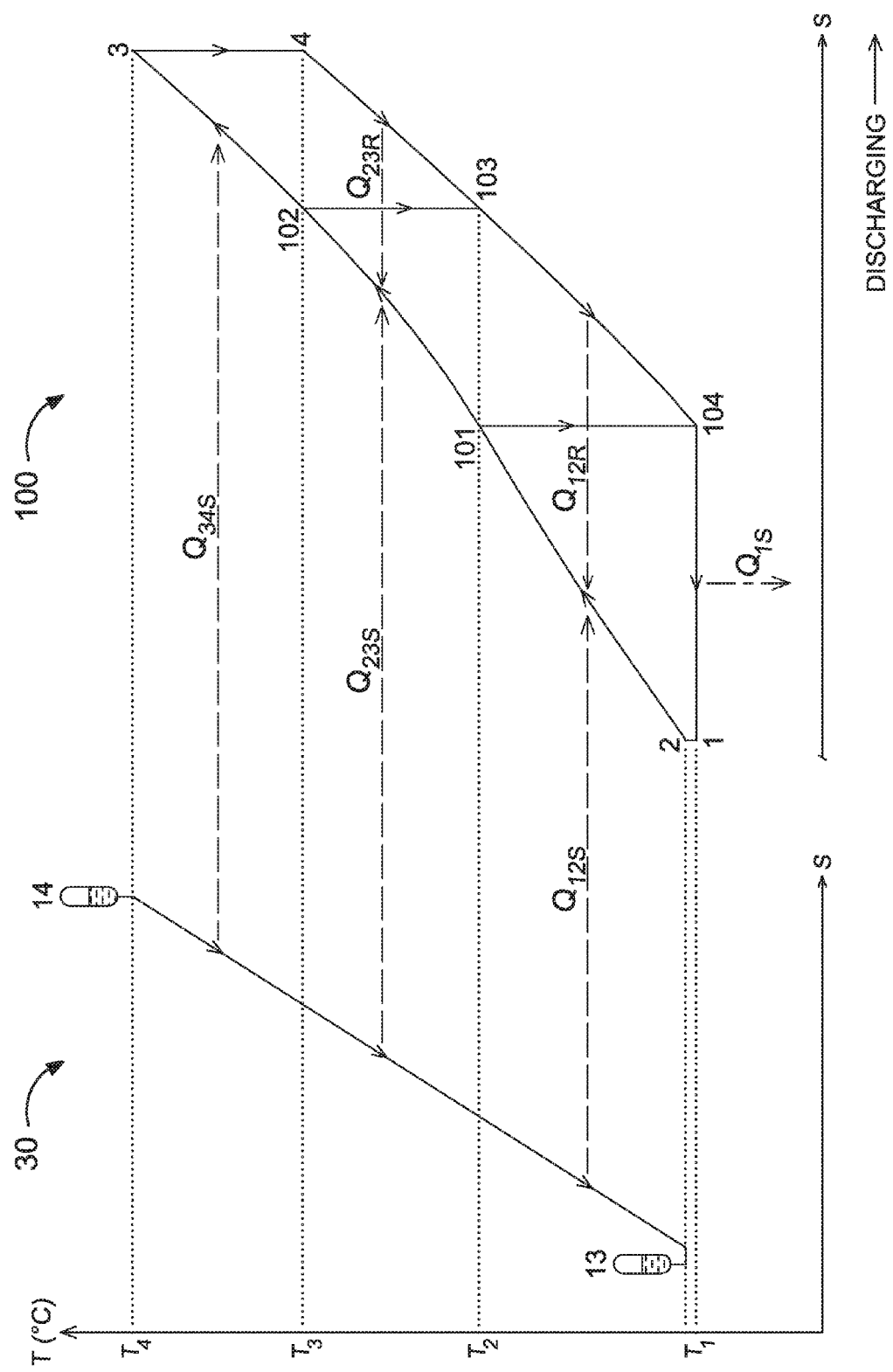
FIG. 10 is a TS diagram of the transcritical cycles of FIGS. 6 and 8 in discharging mode.

A Third Exemplary Thermomechanical Energy Storage and Retrieval Cycle and Layout FIGS. 6 and 10 are TS diagrams of a transcritical cycle 100 and the heat storage subsystem 30. The cycle 100 can generally be considered as a big loop 1-104-103-4-3-102-101-2-1 (FIG. 6), a middle loop 1-104-103-102-101-2-1), and a small loop 1-104-101-2-1) combined. The loops in FIG. 6 are reversed in FIG. 10. FIGS. 6 and 8 show two different charging modes, one in which heat $Q_{1S}$ is transferred into the cycle 100 from a "cold" heat source (FIG. 6), and the other in which heat $Q_{23}$ is transferred into the cycle 100 from a "warm" heat source, such as a solar source (FIG. 8). However, heat may be transferred into the cycle 100 from any of a large number of different sources. The fluid used in the cycle 100 may be, for example, propane. In some applications, the flow direction in the pressure changing process 101-104 is reversed because of the high heat transfer capacity in the high pressure liquid-gas transition of the working fluid. This is the case in some applications (e.g., when carbon dioxide is used as a working fluid).

In one embodiment (FIG. 6), in the charging mode, the cycle 100 absorbs heat $Q_{1S}$ isothermally at 1-104 from a cold storage liquid (e.g., a body or reservoir of water, or an ambient internal or external environment [air]) at a low temperature (e.g., $T_1$), and electricity drives compression processes 104-101, 103-102, and 4-3 that heat the working fluid in the cycle 100, which acts as a heat pump in charging mode In charging mode, the heat storage subsystem 30 absorbs heat $Q_{34S}$, $Q_{23S}$ and $Q_{12S}$ from the high-pressure side of the cycle 100 at 3-102-101-2. Heat $Q_{23R}$ and $Q_{12R}$ is also transferred from the high-pressure side of the cycle 100 at 102-101-2 to the low-pressure side of the cycle 100 at 104-103-4. 104-101, 103-102 and 4-3 are adiabatic compression processes. The working fluid in the cycle 100 changes from liquid to gas at $T_1$ in an isothermal process at 1-104.

Figure 7:
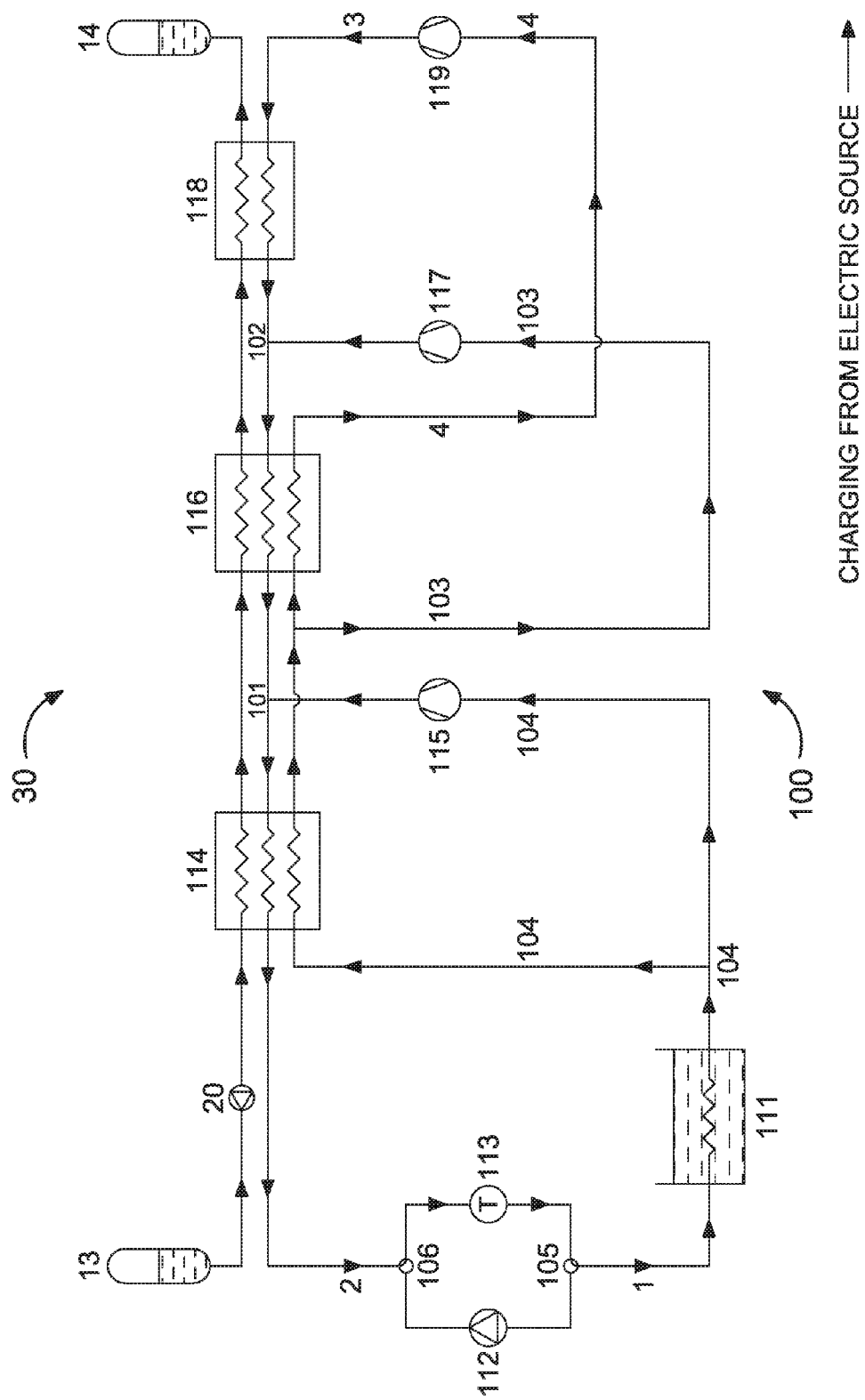
FIG. 7 is an outline of an apparatus implementing the cycle and heat storage subsystem of FIG. 6.

FIG. 7 is an outline of a transcritical apparatus 100 and heat storage subsystem 30 that implements the TS diagram depicted in FIG. 6. In charging mode, the device in FIG. 7 is a transcritical heat pump. 115, 117 and 119 are compressors that implement the adiabatic compression processes at 104-101, 103-102 and 4-3, which provide heat for storage in the heat storage subsystem 30. Recuperators 114 and 116 have dual functions as intraloop and/or inter-loop heat exchangers and as heat storage liquid-working fluid heat exchangers.

In the heat exchanger 118 and the recuperators 116 and 114, heat is rejected from the high pressure working fluid in the transcritical apparatus 100 to the heat storage liquid in the heat storage subsystem 30 in the charging mode. Heat is also rejected from the high pressure working fluid to the low pressure working fluid in the transcritical apparatus 100 in the recuperators 114 and 116. A turbine or JT expander 113 reduces the pressure and the temperature of the working fluid in the transcritical apparatus 100 to the condensation point (e.g., the saturated liquid point) of the working fluid. Valves (e.g., a pair of 3-way valves) 106 and 105 select the turbine or JT expander 113 in the charging mode. The heat exchanger 111 evaporates the working fluid in the transcritical apparatus 100 isothermally. The heat exchanger 111 may be or include a body or reservoir of water, as described herein.

In another embodiment (FIG. 8), solar heat $Q_{23}$ is absorbed by the solar collector 17 over a relatively narrow temperature range $T_2$-$T_3$. The heat $Q_{23}$ is divided in 3 fractions $Q_{23A}$, $Q_{23B}$ and $Q_{23C}$. The heat fraction $Q_{23B}$ is absorbed by the high pressure process 101-102 in the heat engine 101-102-103-104-101, and the heat $Q_{12S}$ rejected by the heat engine 101-102-103-104-101 in the low pressure process 103-104 is transferred as $Q_{12S}$ to the heat storage liquid in the temperature range $T_1$-$T_2$. The heat $Q_{23C}$ is absorbed by the low pressure process 103-4 in the heat pump 103-4-3-102-103, and the heat rejected as $Q_{34S}$ by the high pressure process 3-102 in the heat pump 103-4-3-102-103 is transferred to the heat storage liquid in the temperature range $T_3$-$T_4$. The heat $Q_{23A}$ is absorbed directly by the heat storage liquid in the temperature range $T_2$-$T_3$. By doing so, an optimal heat absorption region $T_2$-$T_3$ can be chosen for heat absorption from the solar energy source 17, but heat can be transferred to the heat storage subsystem 30 in a wide temperature region $T_1$-$T_4$. It is important that the heat $Q_{12S}$ and $Q_{34S}$ is rejected to the heat storage liquid at a temperature range different from the temperature range in which the solar heat $Q_{23}$ is absorbed by the high pressure process 101-102 in the heat engine and the low pressure process 103-4 in the heat pump to spread the solar heat out over the entire temperature range of the heat storage fluid in the heat storage subsystem 30. Thus, the heat $Q_{23}$ drives the cycle 100 (which acts as a heat pump in charging mode), and the expansion process 102-103 provides energy to drive the compression processes 104-101 and 4-3.

Compared to the system of FIG. 6, the solar collector 17 is a relatively high temperature heat source. Furthermore, any disadvantages associated with relatively high temperature solar energy collection (e.g., an expensive concentrating tracking collector) and with relatively low temperature solar energy collection (e.g., low thermodynamic efficiency) can be avoided. A cheap heat storage liquid can also be utilized, which can store more energy per kg than the combination of a salt mixture and steam cycle, while avoiding its disadvantages (the expense, handling difficulties [i.e., the salt is solid at normal or ambient temperatures], thermodynamic losses in the steam cycle, etc.). With reversible compressor-expanders, the same equipment may be used for charging and discharging modes. In the charging mode, the small cycle 1-2-101-104-1 is inactive. In discharging mode, the cycle 100 in FIG. 10 is used.

Figure 9:
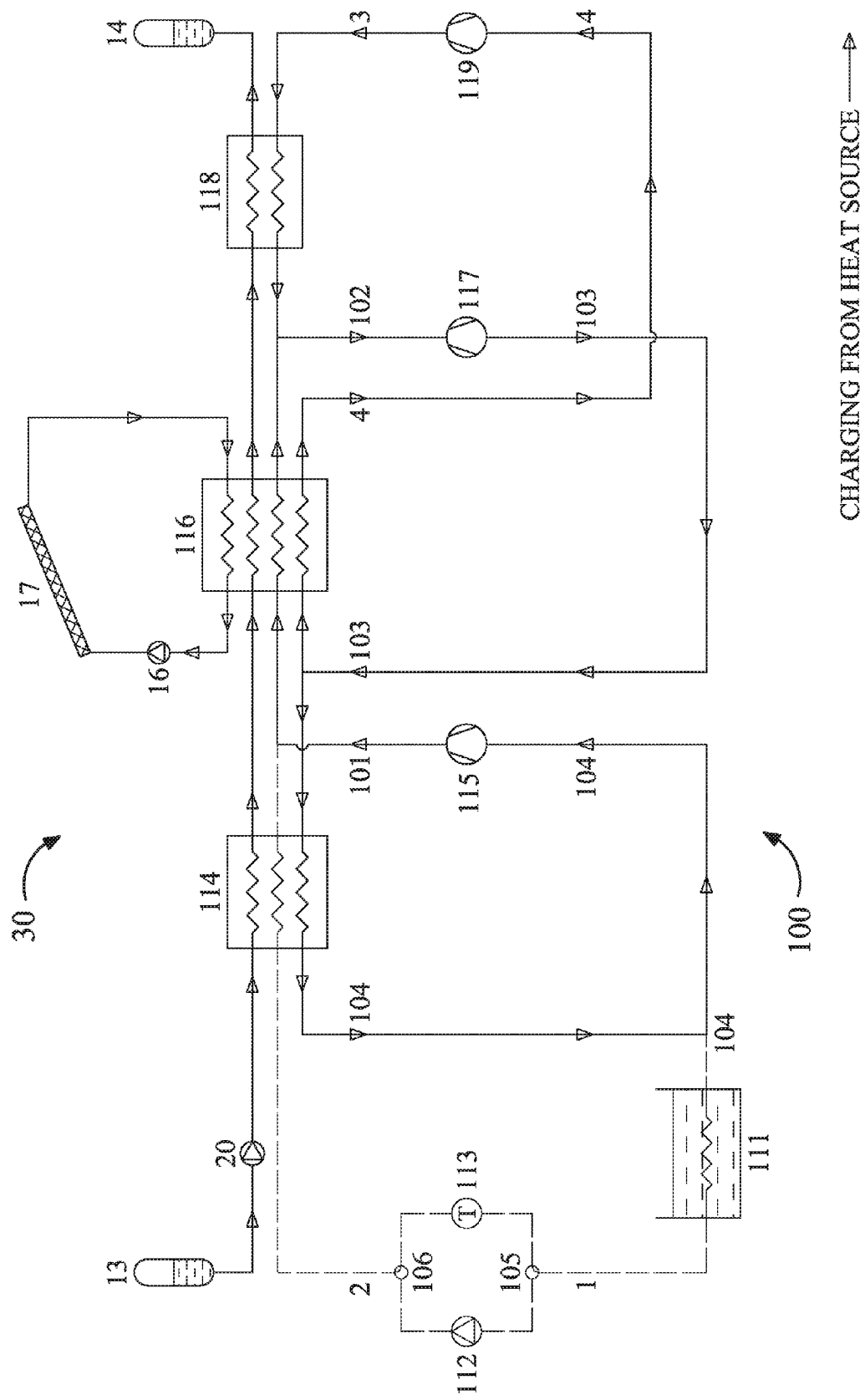
FIG. 9 is an outline of an apparatus implementing the cycle and heat storage subsystem of FIG. 8.

FIG. 9 is an outline of a transcritical apparatus 100 and heat storage subsystem 30 that implements the TS diagram depicted in FIG. 8. In charging mode, the device in FIG. 9 is a transcritical heat pump. 115 and 119 are compressors. 117 is an expander. In the charging mode, pump 20 in the heat storage subsystem 30 pumps the heat storage liquid from cold fluid storage tank 13 to hot storage liquid tank 14. The loop segment 104-1-2-101 (shown as dashed lines in FIG. 8) is not operating in FIG. 9, as indicated by the dashed line in that loop segment. Thus, the apparatus 100 may not include the pump 112, the cold heat source/heat exchanger 111, or the middle heat exchange device (e.g., radiator) in the heat exchanger 114, or may further include (i) a first valve (not shown) in the path between the T-joint at 101 and the heat exchanger 114 and (ii) a second valve (not shown) in the path between the T-joint at 104 and the cold heat source/heat exchanger 111.

At least part of the cycle(s) and some of the processes are reversed in discharging mode (FIGS. 10 and 11) relative to the charging modes (FIGS. 6 and 7). The discharging mode complementary to the charging modes of the thermomechanical energy storage systems of FIGS. 6 and 7 is the same, because the same heat stored in the heat storage subsystem 30 is transformed to mechanical energy (e.g., by the expanders 115, 117 and 119 in FIG. 11) in the same way in both cases.

In discharging mode (FIG. 10), the heat $Q_{12S}$, $Q_{23S}$ and $Q_{34S}$ from the heat storage fluid in the heat storage subsystem 30 at 13-14 is transferred to the high pressure working fluid in the transcritical cycle 100 at 2-101-102-3, and heat $Q_{1S}$ from the low pressure working fluid in the transcritical cycle 100 at 104-1 is transferred (e.g., isothermally) to a low temperature heat storage fluid (not shown, but as described or incorporated by reference herein). Adiabatic expansion processes occur between 3-4 in the big loop, 102-103 in the middle loop, and 101-104 in the small loop; thereby retrieving or recovering mechanical energy (e.g., work). A pumping process occurs between 1 and 2.

Intraloop and/or inter-loop heat transfer in the transcritical cycle 100 occurs from 4-103 to 101-102. The heat transfer is intraloop in the big loop, and inter-loop from the big loop to the middle loop, from the big loop to the small loop, and from the middle loop to the small loop. Intra-loop working fluid heat transfer occurs in middle loop from 103-104 to 2-101. Heat transfer to the high pressure working fluid occurs in all loops (e.g., at 2-101 in the small loop, at 2-101 and 101-102 in the big and middle loops, and at 102-3 in the big loop) from the hot storage liquid at 13-14. Heat transfer from the low pressure working fluid in the transcritical cycle 100 occurs in all loops in the isothermal process 104-1 to a cold storage liquid (not shown, but as described herein).

Figure 11:
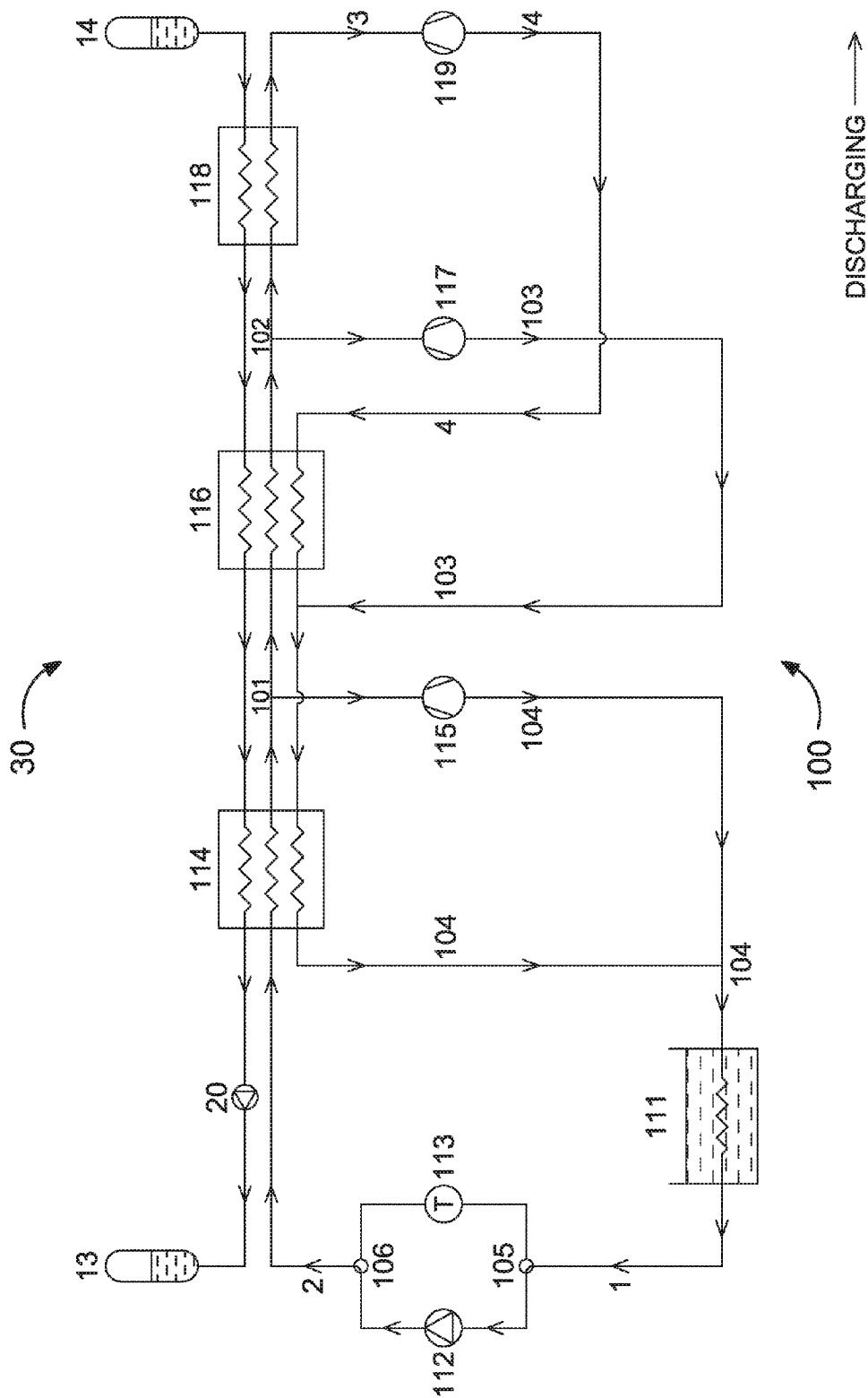
FIG. 11 is an apparatus similar or identical to that of FIG. 7, implementing the cycle and heat storage subsystem in discharging mode.

FIG. 11 is an outline of the transcritical apparatus 100 and heat storage subsystem 30 that implements the TS diagram depicted in FIG. 10 in discharging mode. The device in FIG. 11 (discharging mode) is a transcritical heat engine. Recuperators 114 and 116 have dual functions as intraloop and/or inter-loop heat exchangers and as heat storage liquid-working fluid heat exchangers.

Starting at 1 in the big loop, the pump 112 pumps the working fluid in the transcritical apparatus 100 from 1 to 2 in the discharging mode. The recuperators 114 and 116 and the heat exchanger 118 cool the hot storage liquid in the heat storage subsystem 30 from $T_4$ to $T_1$, while heating the working fluid in the transcritical apparatus 100 from $T_1$ to $T_4$ at 2-101-102-3. The expander 119 expands the gas in the big loop of the transcritical apparatus 100 from 3 to 4, thereby recovering or retrieving mechanical energy. The recuperators 116 and 114 cool the low pressure gas in the transcritical apparatus 100 at 4-103-104. The heat exchanger at 111 transfers heat to the cold storage liquid (as described herein) at $T_1$, while condensing the working fluid in the transcritical apparatus 100 from 104 to 1.

Starting at 1 in the middle loop, the pump 112 pumps the working liquid in the transcritical apparatus 100 from 1 to 2. The recuperators 114 and 116 cool the hot storage liquid in the heat storage subsystem 30 from $T_3$ to $T_1$ (FIG. 10), while heating the working fluid in the transcritical apparatus 100 from $T_1$ to $T_3$ at 2-101-102 (see also FIG. 11). The expander 117 expands the gas in the middle loop of the transcritical apparatus 100 from 102 to 103, thereby recovering or retrieving mechanical energy. The recuperator 114 cools the low pressure gas in the transcritical apparatus 100 at 103-104. The heat exchanger at 111 transfers heat to the cold storage liquid (as described herein) at $T_1$, while condensing the working fluid in the transcritical apparatus 100 from 104 to 1.

Starting at 1 in the small loop, the pump 112 pumps the working liquid in the transcritical apparatus 100 from 1 to 2. The recuperator 114 cools the hot storage liquid in the heat storage subsystem 30 from $T_2$ to $T_1$, while heating the working fluid in the transcritical apparatus 100 from $T_1$ to $T_2$ at 2-101. The expander 115 expands the gas in the transcritical apparatus 100 from 101 to 104, thereby recovering or retrieving mechanical energy. The heat exchanger at 111 transfers heat to the cold storage liquid (as described herein) at $T_1$, while condensing the working fluid in the transcritical apparatus 100 from 104 to 1.

The direction of the small loop is dependent on the working fluid. Propane is used in the depicted example. If carbon dioxide (which has a higher heat capacity) is used, the direction of flow at 101-104 is the opposite of that shown.

Figure 12:
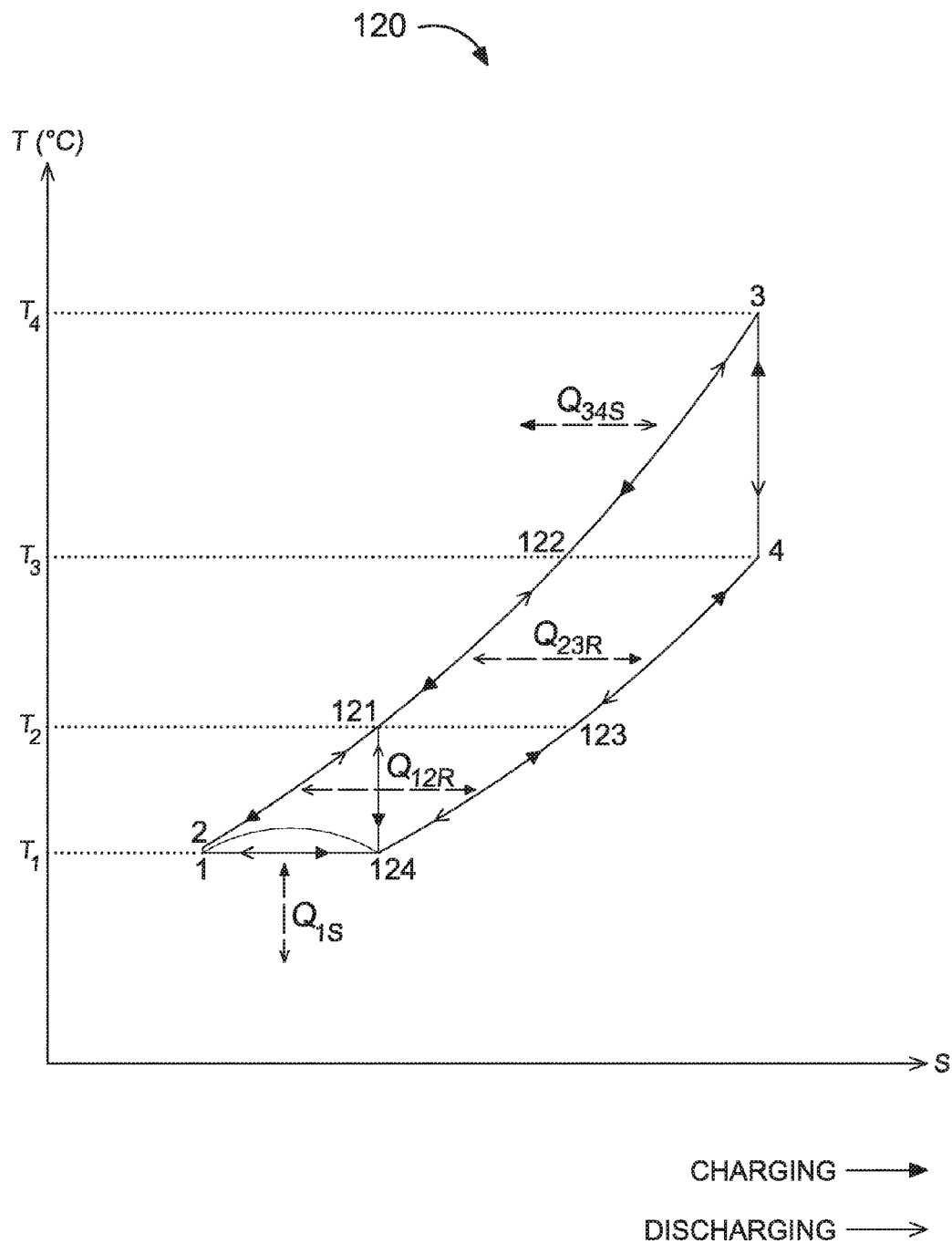
FIG. 12 is a TS diagram of a transcritical cycle with two recuperators and a heat capacity compensating loop.

Another Exemplary Thermomechanical Energy Storage and Retrieval Cycle and Layout FIG. 12 shows a TS diagram for a combined transcritical and Brayton cycle 120. The cycle can be considered as a transcritical loop 1-2-121-122-3-4-123-124-1 and a Brayton loop 124-121-122-3-4-123-124 combined. In this embodiment, the Brayton cycle may be considered to be an "intraloop" heat capacity compensating loop. The system of FIG. 12 can have a heat source (e.g., a solar- and/or electrical-supplemented heat storage subsystem) in the temperature interval $T_3$-$T_4$, and the cycle 120 effectively moves the gradient heat in and out to isothermal heat out and in, respectively, at $T_1$ where the surroundings can be used as a heat source when charging the system. The heat storage subsystem (e.g., 140 in FIG. 13) can then use a heat storage medium with a very high heat capacity in the $T_3$-$T_4$ temperature range. The heat capacity compensating loop advantageously reduces second law losses and improves efficiency in the heat transfers (e.g., between the high pressure side and the low pressure side of the transcritical loop).

In discharging mode, the heat $Q_{34S}$ from a hot heat storage fluid (not shown, but as described herein) is transferred to the high pressure working fluid in the combined cycle 120 at 122-3 in the temperature interval $T_3$-$T_4$, and the heat $Q_{1S}$ from the low pressure working fluid in the transcritical loop in the process 124-1 is isothermally transferred to a low temperature heat storage liquid (not shown, but as described herein). Alternatively, heat $Q_{1S}$ is transferred from the low pressure working fluid in the isothermal process 124-1 to a "cold" storage liquid or an ambient temperature fluid or gas. An adiabatic expansion process occurs from 3 to 4, and a compression process occurs from 124 to 121. A pumping process occurs from 1 to 2. Heat from the working fluid in the big loop is transferred from the low pressure side at 4-123-124 to the high pressure side at 2-121 in the transcritical loop in the temperature range $T_1$-$T_2$ and at 121-122 in the combined cycle 120 in the temperature range $T_2$-$T_3$. In the charging cycle, the cycle(s) and process(es) are reversed.

In charging mode, heat $Q_{1S}$ is absorbed isothermally at 1-124 at temperature $T_1$, heat $Q_{12R}$ is transferred by an interloop gradient heat exchange from the high-pressure side (e.g., 121-2) of the cycle 120 to the low-pressure side (e.g., 124-123) of the cycle 120, and heat $Q_{23R}$ is absorbed by an intraloop gradient heat exchange from the high-pressure side (e.g., 122-121) of the cycle 120 to the low-pressure side (e.g., 123-4) of the cycle 120. The temperature of the working fluid in the low-pressure side of the cycle 120 increases at 4-3 (e.g., in a compression process), and the heat $Q_{34S}$ is transferred to the hot storage liquid within the temperature range $T_4$-$T_3$ (i.e., at 3-122), but not in the temperature ranges $T_3$-$T_2$ and $T_2$-$T_1$.

Figure 13:
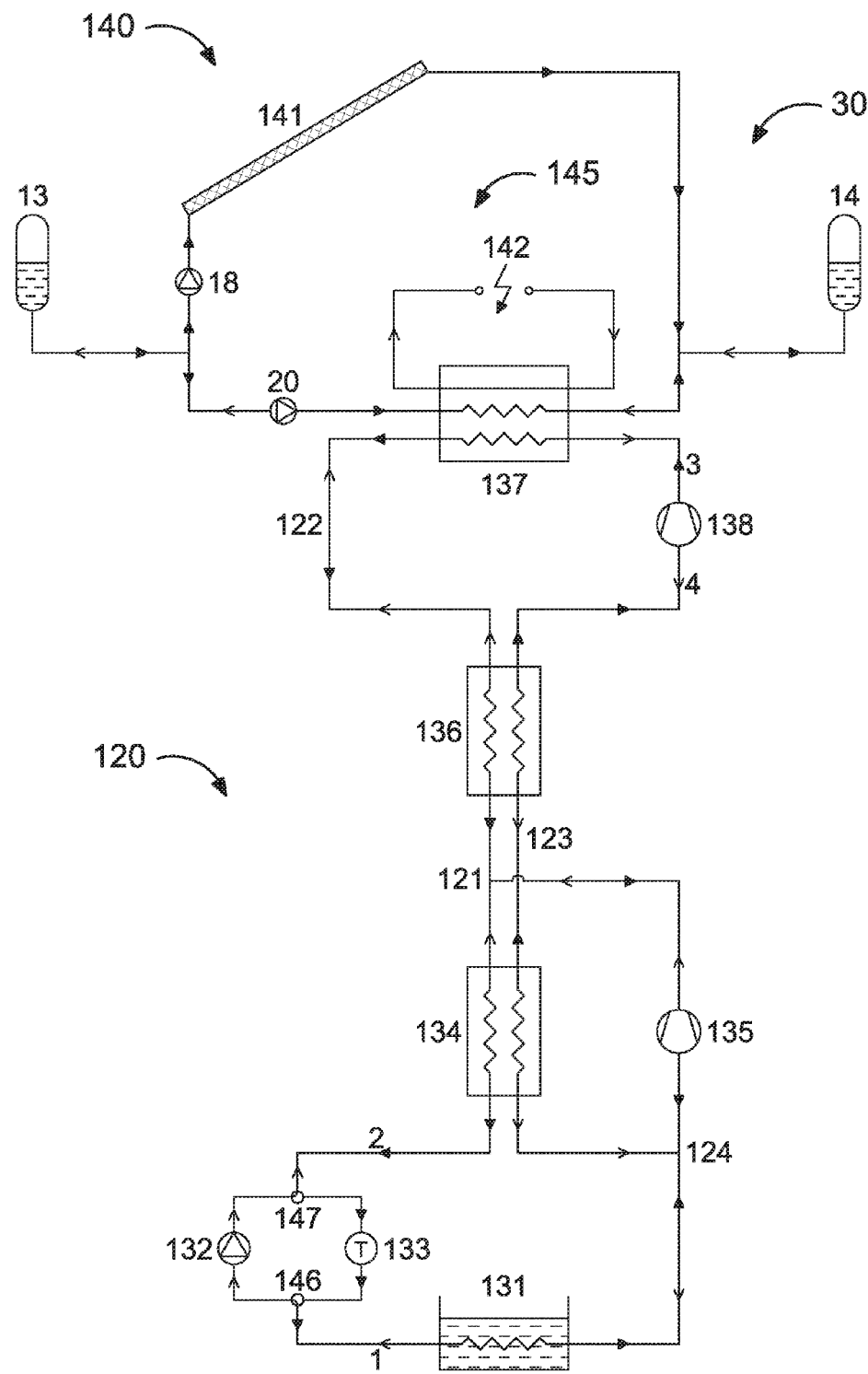
FIG. 13 is an outline of an apparatus implementing the cycle of FIG. 12 with solar or electric heating (or heat pump heating) of the hot storage liquid.

FIG. 13 is an outline of an apparatus that implements the combined cycle 120 depicted in the FIG. 12 TS diagram.

In discharging mode, the device 120 in FIG. 13 is a transcritical heat engine. Starting at 1, the pump 132 pumps the working fluid from 1 to 2. The heat exchangers 134, 136 and 137 heat the high pressure working fluid in the transcritical heat engine 120 at 2-121-122-3. The heat exchangers 134 and 136 may function as recuperators. The hot storage fluid in the heat storage subsystem 140 heats the working fluid in the transcritical heat engine 120 by heat exchange in the heat exchanger 137 while it is pumped from tank 14 to tank 13 by the pump 20. The expander 138 expands the gas from 3 to 4, thereby retrieving or recovering mechanical energy. The heat exchangers (e.g., recuperators) 136 and 134 cool the low pressure gas in the transcritical heat engine 120 at 4-123-124. The compressor 135 compresses the gas in the transcritical heat engine 120 from 124 to 121. The heat exchanger in 131 transfers heat to a cold storage liquid at $T_1$, while condensing the working fluid in the transcritical heat engine 120 from 124 to 1.

In charging mode, the hot storage fluid in the heat storage subsystem 140 is pumped from tank 13 to tank 14 by pump 18 or 20, and is heated by the solar collector 141 or by the device 120 and electric energy 142 (e.g., resistive heating), depending on whether pump 18 or 20 is on. The device 120 works as a heat pump in charging mode (i.e., in the reverse sequence of the discharging mode). In one embodiment, one of the pumps 18 and 20 is turned off when the other pump 20 or 18 is on. Resistive heating may be used to heat the hot storage fluid in the heat storage subsystem 140 when electricity is relatively inexpensive, for example. 135 is an expander, 138 is compressor, and 133 is a turbine or JT expander. Valves (e.g., a pair of 3-way valves) 9a and 9b select between the pump 132 and the turbine or JT expander 133, depending on whether the transcritical cycle 120 is in discharging or charging mode, respectively.

Figure 14:
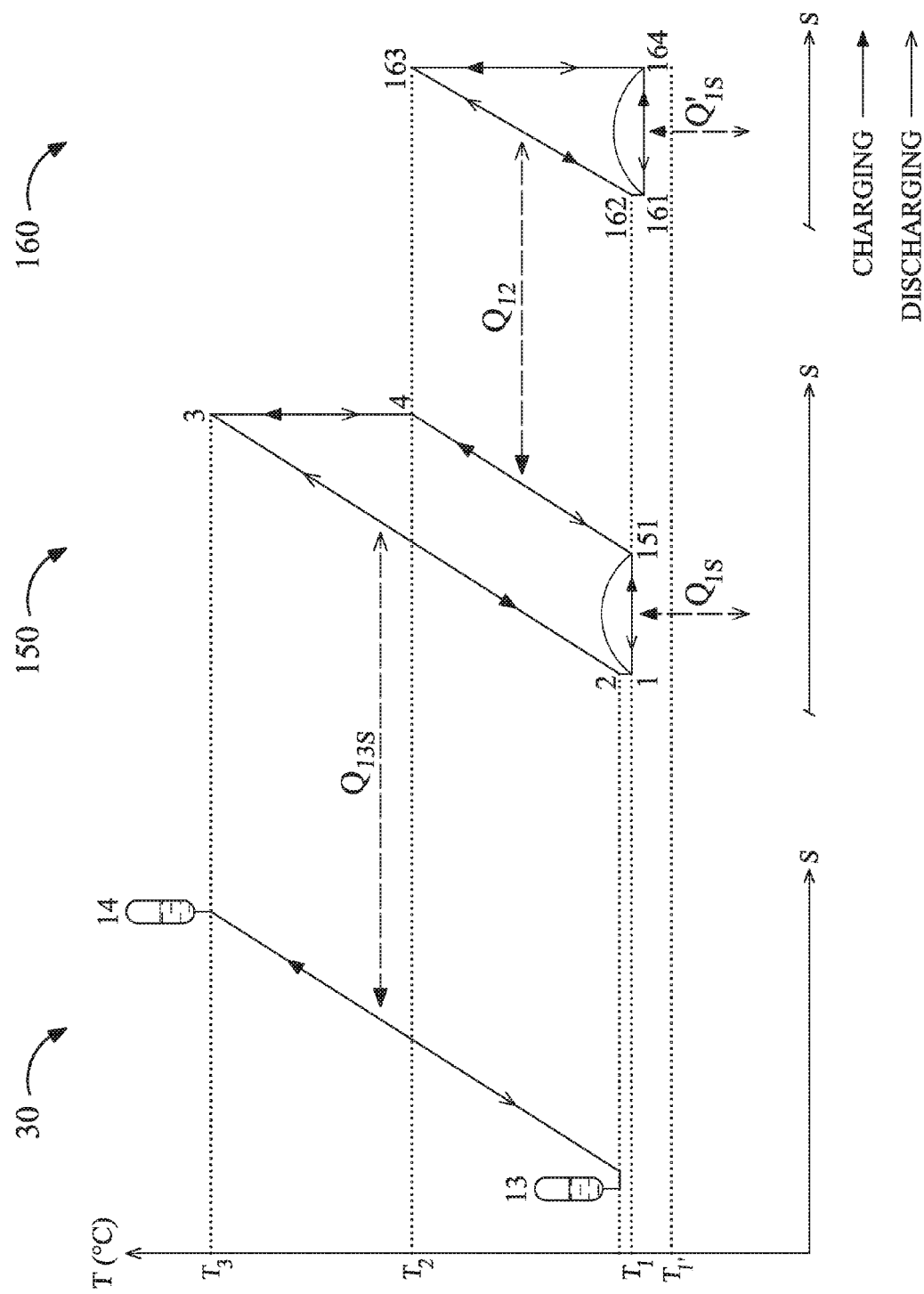
FIG. 14 is a TS diagram of combined transcritical and trilateral cycles. This is useful when the cold storage fluid is replaced by ambient temperature air or water.

A Further Exemplary Thermomechanical Energy Storage and Retrieval Cycle and Layout FIG. 14 shows a TS diagram for two transcritical cycles 150 and 160, in conjunction with the thermal energy storage subsystem 30. The first transcritical cycle 150 is 1-2-3-4-151-1, and the second transcritical cycle 160 is 161-162-163-164-161.

In discharging mode, the heat $Q_{13S}$ from the heat storage fluid in thermal energy storage subsystem 30 is transferred to the high pressure working fluid at 2-3 in the first transcritical cycle 150. An adiabatic expansion process occurs between 3-4 in the first transcritical cycle 150 and 163-164 in the second transcritical cycle 160, thereby retrieving or recovering mechanical energy. In the first transcritical cycle 150, the working fluid is pumped from 1 to 2, and in the second transcritical cycle 160, the working fluid is pumped from 161 to 162.

Heat $Q_{12}$ is transferred between the working fluids in the two cycles from the low pressure side at 4-151 in the first transcritical cycle 150 to the high pressure side 162-163 in the second transcritical cycle 160 in the discharging mode. Heat $Q_{1S}$ and $Q'_{1S}$ is rejected from the low pressure working fluid in both cycles 150 and 160 by the isothermal processes 151-1 and 164-161, respectively. In the charging cycle (discussed in more detail with regard to FIG. 15), the cycle(s) and process(es) are reversed.

Figure 15:
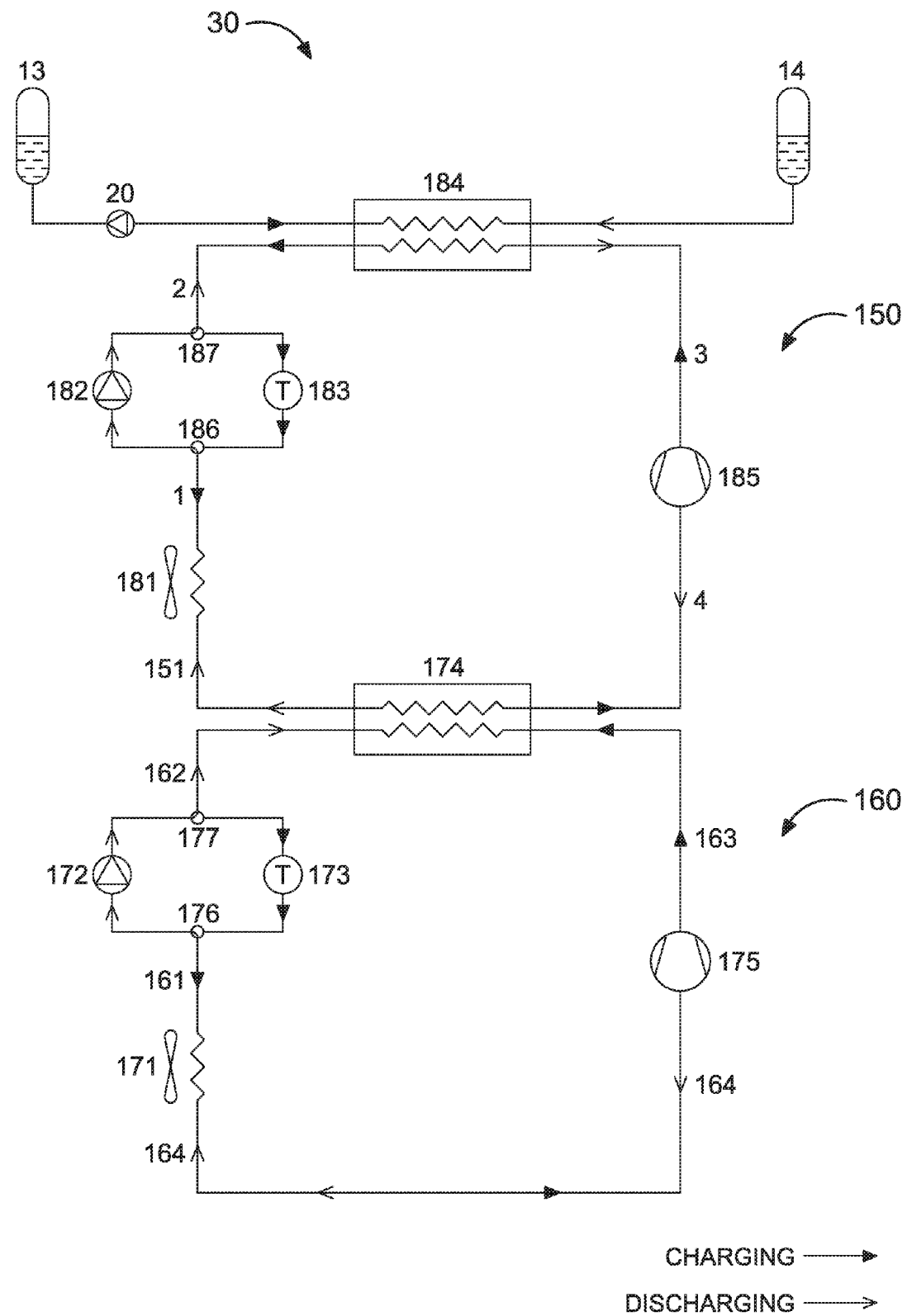
FIG. 15 is an outline of an apparatus implementing the cycles of FIG. 14.

FIG. 15 is an outline of a transcritical apparatus implementing the TS diagram depicted in FIG. 14.

In discharging mode, the devices 150 and 160 in FIG. 15 are transcritical heat engines. Starting at 1 in the first cycle 150, the pump 182 pumps the working fluid from 1 to 2. The heat exchanger 184 cools the hot storage fluid in the heat storage subsystem 30 while it is pumped from tank 14 to tank 13, while heating the working fluid in the first transcritical cycle 150 at 2-3. The expander 185 expands the gas from 3 to 4, thereby retrieving or recovering mechanical energy. The heat exchanger 174 cools the working fluid in the first transcritical cycle 150 at 4-151, while heating the working fluid in the second transcritical cycle 160 at 162-163.

Starting at 161 in the second transcritical cycle 160, the pump 172 pumps the working liquid from 161 to 162. The heat exchanger 174 heats the working fluid from 162 to 163 as mentioned above. The expander 175 expands the gas from 163 to 164, thereby retrieving or recovering additional mechanical energy. The heat exchangers 181 and 171 in the first and second transcritical cycles 150 and 160, respectively, transfer heat to an ambient environment or a cold storage liquid (not shown, but as described herein) at $T_1$ while condensing the working fluids from 151 to 1 in the first transcritical cycle 150 and from 164 to 161 in the second transcritical cycle 160, respectively. In various embodiments, heat exchangers 181 and 171 may transfer heat to internal or external ambient air, or bodies or reservoirs of water. The ambient air may be in different internal and/or external environments, or may be different locations in the same internal or external environment. Similarly, the bodies or reservoirs of water may be different bodies or reservoirs of water, or different locations in the same body or reservoir of water.

In charging mode, the devices 150 and 160 in FIG. 15 are transcritical heat pumps. 185 and 175 are compressors, and 183 and 173 are turbines or JT expanders in the first transcritical cycle 150 and the second transcritical cycle 160, respectively. Valves (e.g., a pair of 3-way valves) 186 and 187 between 1 and 2 select between the pump 182 and the turbine or JT expander 183 in the first transcritical cycle 150, depending on whether the transcritical cycle 150 is in discharging or charging mode, respectively. Similarly, valves (e.g., a pair of 3-way valves) 176 and 177 between 161 and 162 select between the pump 172 and the turbine or JT expander 173 in the second transcritical cycle 160, depending on whether the transcritical cycle 160 is in discharging or charging mode, respectively. In the charging mode, the pump 20 pumps in an opposite direction to the direction of pump 20 in the discharging mode.

Figure 16:
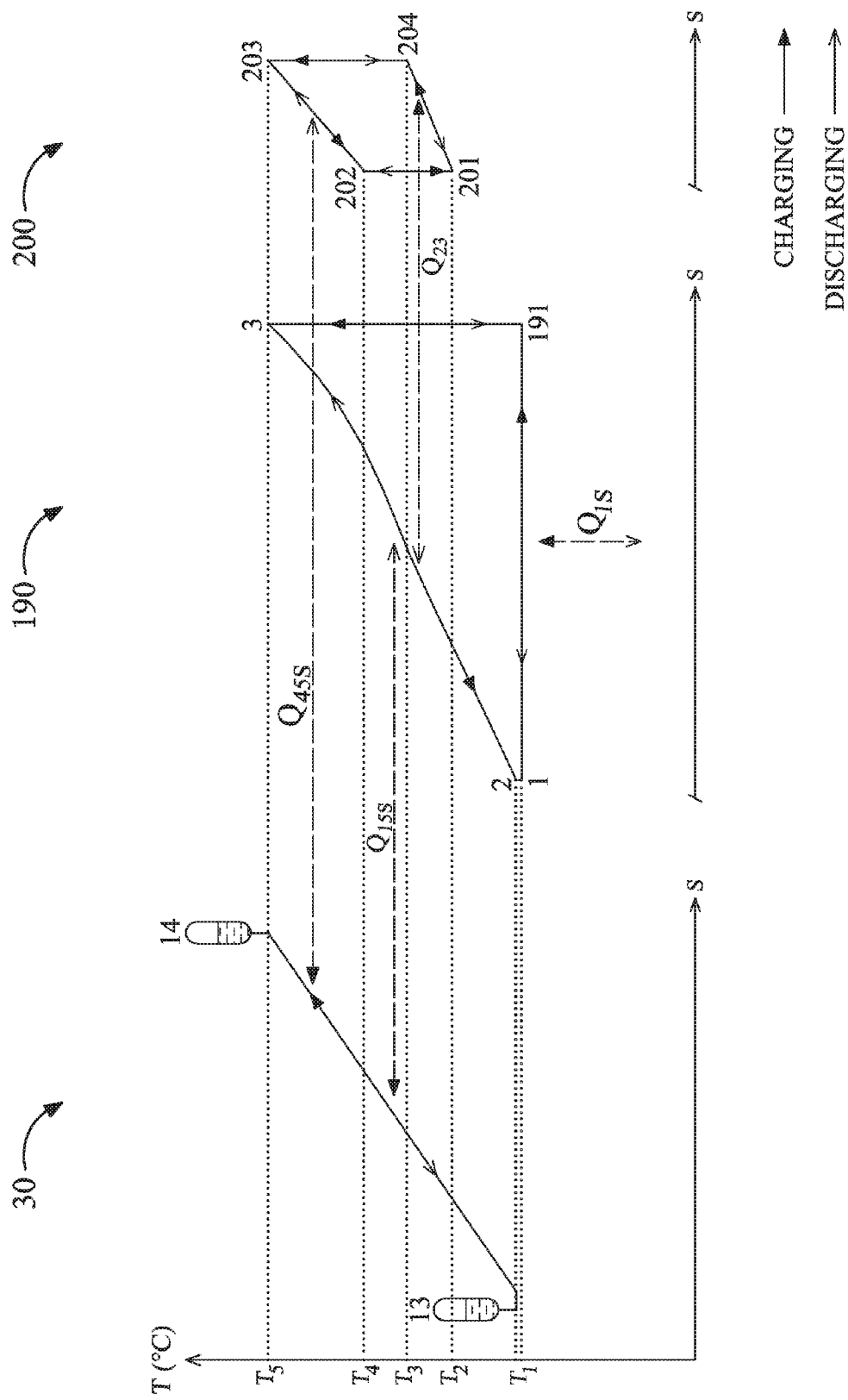
FIG. 16 is a TS diagram of a trilateral cycle with a compensating Brayton cycle transferring heat (i) between a high temperature storage fluid and the compensating Brayton cycle in a temperature region where the heat transfer capacity of the storage fluid is higher than the heat transfer capacity of the trilateral cycle working fluid and (ii) between the Brayton cycle and the trilateral cycle in a temperature region where the heat transfer capacity of the working fluid in the trilateral cycle is higher than the heat transfer capacity of the storage fluid.

Yet Another Exemplary Thermomechanical Energy Storage and Retrieval Cycle and Exemplary Layouts FIG. 16 is a TS diagram of a trilateral cycle 190 with a Brayton compensating cycle 200, in conjunction with the thermal energy storage subsystem 30. The trilateral cycle 190 is 1-2-3-191-1, and the Brayton compensating cycle 200 is 201-202-203-204-201. The exemplary system of FIG. 16 includes a compensating cycle 200 that can be implemented as a separate second cycle for supporting a heat transfer process (e.g., for adding and/or removing heat) at, over or within different temperature intervals. The compensating cycle 200 moves heat from the temperature range $T_2$-$T_3$ to the temperature range $T_4$-$T_5$ in charging mode and from the temperature range $T_5$-$T_4$ to the temperature range $T_3$-$T_2$ in discharging mode.

In discharging mode, the heat $Q_{15S}$ from the heat storage fluid in the thermal energy storage subsystem 30 is transferred to the high pressure working fluid at 2-3 in the trilateral heat engine cycle 190. An adiabatic expansion process occurs between 3 and 191 in the trilateral cycle 190, thereby recovering or retrieving mechanical energy. Heat transfer occurs from the low pressure working fluid in the trilateral cycle 190 in an isothermal process at 191-1 to a cold storage liquid (not shown, but as described herein). A pumping process occurs between 1 and 2 in the trilateral cycle. The residual heat $Q_{45S}$ from the heat storage fluid 30 (i.e., the extra heat from the difference in heat capacities of the heat storage fluid 30 and the working fluid in the trilateral cycle 190 in a relatively high part of the heat transfer temperature range $T_5$-$T_4$) is transferred to the high pressure working fluid at 202-203 in the compensating Brayton engine cycle 200. In this temperature range, the heat capacity of the heat storage fluid is higher than the heat capacity of the working fluid in the trilateral cycle 190. Heat $Q_{23}$ is transferred from the working fluid in the low pressure side 204-201 of the compensating cycle 200 to the high pressure side 2-3 in a relatively low temperature range $T_2$-$T_3$ of the trilateral cycle 190. In this temperature range, the heat capacity of the working fluid in the trilateral cycle 190 may be higher than the heat capacity of the heat storage fluid in the heat storage subsystem 30. An adiabatic expansion process occurs between 203 and 204 in the compensating cycle 200, thereby recovering or retrieving additional mechanical energy. An adiabatic compression process occurs between 201 and 202 in the Brayton compensating cycle 200.

In charging mode, the trilateral cycle 190 and the compensating cycle 200 are heat pumps, and the cycle(s) and process(es) are reversed.

Thus, in the embodiment of FIG. 16, some of the heat rejected by the hot storage liquid in discharging mode is absorbed by the compensating cycle 200 within a first temperature range $T_4$-$T_5$ in which the heat capacity of the hot storage liquid is higher than the heat capacity of the working fluid in the cycle 190, and is rejected by the compensating cycle 200 to the high-pressure side of the trilateral cycle 190 within a second, different temperature range $T_3$-$T_2$ in which the heat capacity of the working fluid in the cycle 190 is higher than the heat capacity of the heat storage liquid. The match in heat capacities occurs when the heat from the cycle 200 is added to the heat from the heat storage medium in the temperature range $T_3$-$T_2$. The heat $Q_{15S}$ added to the cycle 190 along the gradient heat transfer line 2-3 is valid, as well as to the cycle 200 in the temperature range $T_4$-$T_5$. $Q_{45S}$ (i.e., the heat added to the cycle 200 in the temperature range $T_4$-$T_5$) represents the heat resulting from the difference in heat capacities in the temperature range $T_4$-$T_5$. In the charging mode, the heat $Q_{23}$ rejected from the high-pressure side of the cycle 190 to the low-pressure side of the cycle 200 may compensate for the difference in the heat capacities of the hot storage liquid and the working fluid of the cycle 200 in the temperature range $T_3$-$T_2$.

Figure 17:
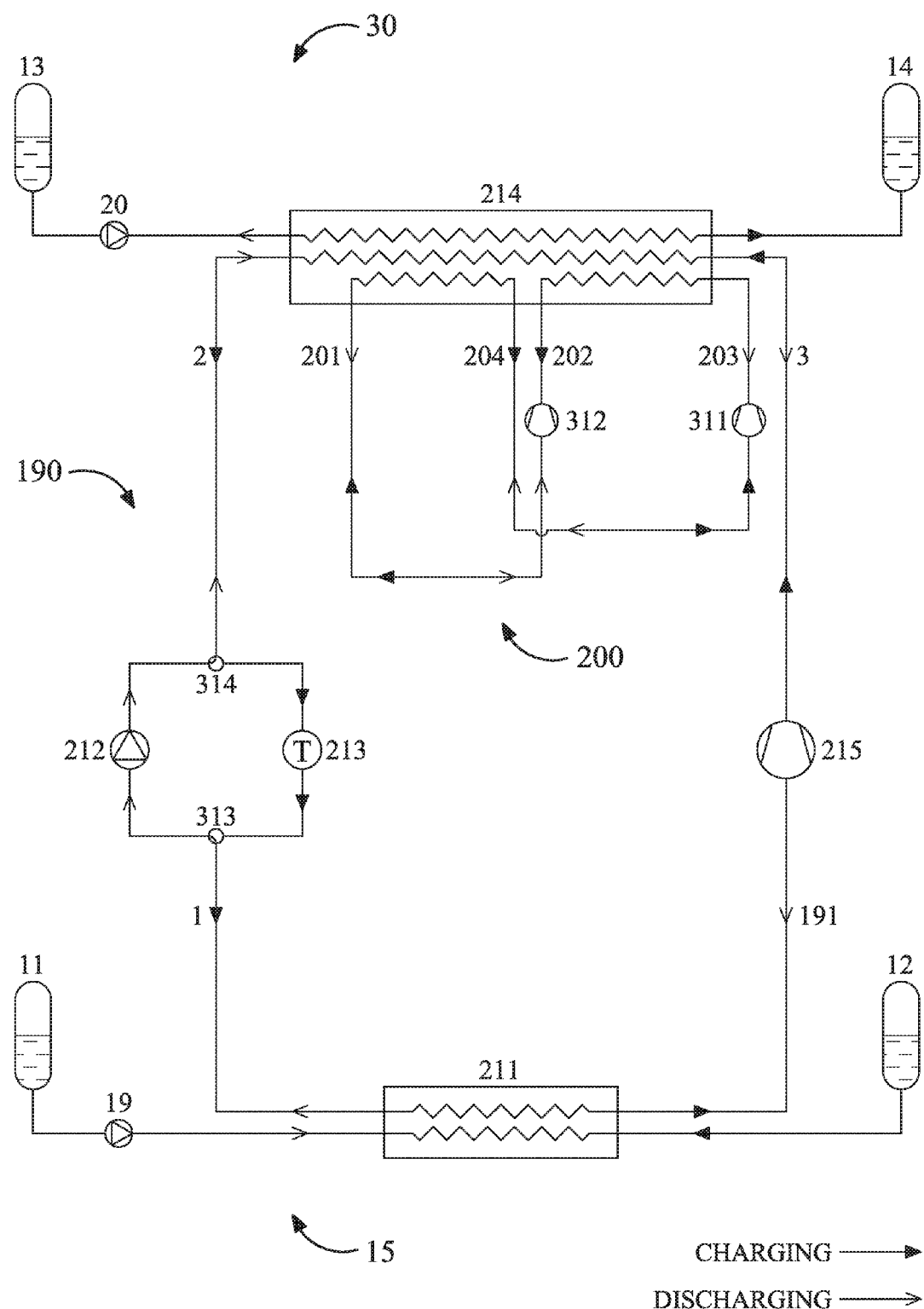
FIG. 17 is an outline of an apparatus implementing the cycles and heat storage subsystems of FIG. 16.

FIG. 17 is an outline of an apparatus implementing the cycles 190 and 200 and heat storage subsystem 30 of FIG. 16.

In discharging mode, the device in FIG. 17 is a trilateral heat engine 190 with a Brayton heat engine loop 200. Starting at 1 in the trilateral cycle 190, the pump 212 pumps the working fluid from 1 to 2. The hot storage fluid in the heat storage subsystem 30 heats the working fluid from 2 to 3 in the trilateral cycle 190 by gradient heat exchange in the heat exchanger 214 while the hot storage fluid is pumped from tank 14 to tank 13. The expander 215 expands the gas from 3 to 191, thereby retrieving or recovering mechanical energy. The heat exchanger 211 transfers heat to a cold storage liquid (e.g., in low-temperature heat storage subsystem 15, as it is pumped from low-temperature tank or vessel 11 to high-temperature tank or vessel 12) at $T_1$ while condensing the working fluid from 191 to 1 in the trilateral cycle 190.

Starting at 201 in the compensating cycle 200, in the discharging mode, the working fluid is heated from 201 to 202 by a compressor 312, then heat is transferred from the heat storage fluid in the heat storage subsystem 30 to the high pressure working fluid at 202-203 in a relatively high temperature range $T_4$-$T_5$ in the heat exchanger 214. An expander 311 expands the gas from 203 to 204, thereby retrieving or recovering additional mechanical energy. In the heat exchanger 214, heat is transferred from the low pressure working fluid in the compensating cycle 200 to the high pressure working fluid in the trilateral cycle 190 in a relatively low temperature range $T_3$-$T_2$ of the process 2-3.

In the charging mode, 215 and 311 are compressors in the trilateral cycle 190 and the compensating cycle 200, respectively. 213 is a turbine or JT expander in the trilateral cycle 190. Valves (e.g., a pair of 3-way valves) 313 and 314 select between the pump 212 and the turbine or JT expander 213, depending on whether the trilateral cycle 190 is in discharging or charging mode, respectively. In the charging mode, 312 is an expander in the compensating cycle 200, and the pump 20 pumps fluid in an opposite direction to the direction of the pump 20 in the discharging mode.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the claims appended hereto and their equivalents.

What is claimed is:

1. A thermo-mechanical energy storage system comprising:
a first heat storage chain comprising:
a cold storage reservoir,
a hot storage reservoir,
a heat storage fluid that is transferred between the hot storage reservoir and the cold storage reservoir, and
a first gradient heat exchanging device;
an apparatus comprising a plurality of loops, each loop comprising:
a pressure increasing device,
a pressure decreasing device,
a low pressure heat exchanging device,
a high pressure heat exchanging device, and
a working fluid, wherein:
the working fluid in each loop is a common working fluid or a different working fluid;
the pressure increasing device in each of said plurality of loops is a shared pressure increasing device or a different pressure increasing device;
the pressure decreasing device in each of said plurality of loops is a shared pressure decreasing device or a different pressure decreasing device;
in each of said plurality of loops, at least one of said low pressure heat exchanging device and said high pressure heat exchanging device is a second gradient heat exchanging device,
at least one second gradient heat exchanging device exchanges heat with said heat storage fluid, and
at least one of said plurality of loops is configured to compensate for a heat capacity difference between the working fluid in said at least one of said plurality of loops and either (i) when the working fluid in each loop is said common working fluid, said heat storage fluid or (ii) when the working fluid in each loop is said different working fluid, said heat storage fluid or said different working fluid;
wherein when the system is charging, the first heat storage chain is a first heat sink and at least a first one of said low pressure heat exchanging device and said high pressure heat exchanging device in at least a first one of said plurality of loops exchanges heat with a first heat source, and when the system is discharging, the first heat storage chain is a second heat source and at least a second one of said low pressure heat exchanging device and said high pressure heat exchanging device in at least a second one of said plurality of loops exchanges heat with a second heat sink, the first and second ones of said low pressure heat exchanging device and said high pressure heat exchanging device being a same heat exchanging device or different heat exchanging devices, and the first and second ones of said plurality of loops being a same loop or different loops.

2. The thermo-mechanical energy storage system of claim 1, wherein at least two of the plurality of loops have (i) a common pressure increasing device or a common pressure decreasing device and (ii) a common working fluid.

3. The thermo-mechanical energy storage system of claim 2, wherein each of said second gradient heat exchanging devices exchanges heat with said heat storage fluid.

4. The thermo-mechanical energy storage system of claim 1, wherein the first heat storage chain and the apparatus are reversible, and the system increases a heat content of said heat storage fluid in charging mode and decreases the heat content of said heat storage fluid in discharging mode.

5. The thermo-mechanical energy storage system of claim 4, further comprising one or more solar collectors configured to deliver at least part of said heat content.

6. The thermo-mechanical energy storage system of claim 5, wherein a thermodynamic cycle of a first one of said plurality of loops is a heat engine, a thermodynamic cycle of a second one of said plurality of loops is a heat pump, mechanical energy delivered by said heat engine drives said heat pump, the storage fluid absorbs solar heat in a first temperature range across said first gradient heat exchanging device, the low pressure heat exchanger of the heat pump and/or the high pressure heat exchanger of the heat engine absorb solar heat in a second temperature range, the second temperature range being the same as or different from the first temperature range, and the low pressure heat exchanger of the heat engine and/or the high pressure heat exchanger of the heat pump rejects heat to the heat storage liquid.

7. The thermo-mechanical energy storage system of claim 1, wherein the first heat storage chain and the apparatus are reversible, and the system decreases a heat content of said heat storage fluid in charging mode and increases the heat content of said heat storage fluid in discharging mode.

8. The thermo-mechanical energy storage system of claim 1, wherein said second heat sink or said first heat source comprises a second heat storage chain.

9. The thermo-mechanical energy storage system of claim 1, wherein said second heat sink or said first heat source is an ambient environment.

10. The thermo-mechanical energy storage system of claim 1, wherein said second heat sink or said first heat source comprises a solid material.

11. The thermo-mechanical energy storage system of claim 10, wherein said working fluid comprises propane or butane.

12. The thermo-mechanical energy storage system of claim 1, wherein one of the plurality of loops comprises a trilateral cycle, and said trilateral cycle includes an isothermal process that rejects heat to and/or absorbs heat from said second heat sink or said first heat source.

13. The thermo-mechanical energy storage system of claim 1, wherein a thermodynamic cycle of said at least a first one of said plurality of loops configured to compensate for a heat capacity difference is a Brayton cycle.

14. The thermo-mechanical energy storage system of claim 13, wherein a thermodynamic cycle of a second one of said plurality of loops is a transcritical cycle.

15. The thermo-mechanical energy storage system of claim 14, wherein said first heat source and said second heat sink comprise an ambient environment, and said transcritical cycle includes an isothermal process that rejects heat to and absorbs heat from said ambient environment.

16. The thermo-mechanical energy storage system of claim 15, wherein the low pressure heat exchanger in the transcritical cycle loop includes a quasi-isothermal heat transfer process.

17. The thermo-mechanical energy storage system of claim 1, wherein at least one of said plurality of loops comprises a transcritical cycle, and said transcritical cycle includes an isothermal process that rejects heat to and/or absorbs heat from said second heat sink or said first heat source.

18. The thermo-mechanical energy storage system of claim 1, wherein a thermodynamic cycle of a first one of said plurality of loops is a heat engine, a thermodynamic cycle of a second one of said plurality of loops is a heat pump, and mechanical energy delivered by said heat engine drives said heat pump.

19. The thermo-mechanical energy storage system of claim 1, wherein said heat storage fluid comprises glycerol.

20. The thermo-mechanical energy storage system of claim 1, wherein said at least one of said plurality of loops configured to compensate for said eat capacity difference comprises at least one compensating cycle that exchanges heat with the heat storage fluid or, when the working fluid in each loop is said different working fluid, said different working fluid in a first temperature range in which the heat capacity of the heat storage fluid is different from the heat capacity of the working fluid(s) within a temperature range of a corresponding gradient heat exchanging device and exchanges heat with another one of said plurality of loops in a second, different temperature range.

21. The thermo-mechanical energy storage system of claim 1, wherein said at least one of said plurality of loops configured to compensate for said heat capacity difference (i) comprises a second pressure increasing or decreasing device and (ii) exchanges heat multiple times in a predetermined temperature range.

22. The thermo-mechanical energy storage system of claim 1, wherein said first heat source and/or said second heat sink comprises a heat storage device.

\* \* \* \* \*